(12) United States Patent
Edo et al.

(10) Patent No.: US 12,245,548 B2
(45) Date of Patent: Mar. 11, 2025

(54) AGRICULTURAL WORK MACHINE SUCH AS HARVESTER

(71) Applicant: Kubota Corporation, Osaka (JP)

(72) Inventors: Shunsuke Edo, Sakai (JP); Kenichi Iwami, Sakai (JP); Shunsuke Miyashita, Sakai (JP); Takashi Nakabayashi, Sakai (JP)

(73) Assignee: Kubota Corporation, Osaka (JP)

( * ) Notice: Subject to any disclaimer, the term of this patent is extended or adjusted under 35 U.S.C. 154(b) by 730 days.

(21) Appl. No.: 17/605,907

(22) PCT Filed: Apr. 24, 2020

(86) PCT No.: PCT/JP2020/017734
§ 371 (c)(1),
(2) Date: Oct. 22, 2021

(87) PCT Pub. No.: WO2020/218528
PCT Pub. Date: Oct. 29, 2020

(65) Prior Publication Data
US 2022/0210971 A1 Jul. 7, 2022

(30) Foreign Application Priority Data

Apr. 25, 2019 (JP) ................................. 2019-083819
Apr. 25, 2019 (JP) ................................. 2019-083821

(51) Int. Cl.
*A01D 41/127* (2006.01)
*A01D 41/14* (2006.01)
(Continued)

(52) U.S. Cl.
CPC ......... *A01D 41/127* (2013.01); *A01D 41/141* (2013.01); *G06V 10/82* (2022.01); *G06V 20/58* (2022.01)

(58) Field of Classification Search
CPC .. A01D 41/127; A01D 41/141; A01D 75/185; A01D 41/1278; G06V 10/82; G06V 20/58; G06V 20/60
See application file for complete search history.

(56) References Cited

U.S. PATENT DOCUMENTS

2012/0083982 A1* 4/2012 Bonefas ............... G05D 1/0223
382/153
2017/0088132 A1 3/2017 Sagemueller et al.
(Continued)

FOREIGN PATENT DOCUMENTS

CA 2930849 C * 2/2022 ............. A01B 51/02
CN 109195440 A * 1/2019 ............. A01B 33/16
(Continued)

*Primary Examiner* — Mary Cheung
(74) *Attorney, Agent, or Firm* — The Webb Law Firm

(57) ABSTRACT

Provided is a harvester configured to effect a work-performing traveling for harvesting agricultural products in a field while traveling in the field autonomously. This harvester includes a traveling device effecting the work-performing traveling, a machine body supported to the traveling device, a harvesting section supported to a front portion of the machine body and harvesting the products in the field, an imaging device provided at a front portion of the machine body and at a position higher than the harvesting section so as to view down a product present in an un-worked area located forwardly of the harvesting section, a detecting section detecting abnormality in the field from an image imaged by the imaging device, and a controlling section executing an abnormality situation control as a control in accordance with the abnormality detected in the field.

25 Claims, 9 Drawing Sheets

(51) Int. Cl.
  *G06V 10/82* (2022.01)
  *G06V 20/58* (2022.01)

(56) References Cited

U.S. PATENT DOCUMENTS

| 2017/0131718 A1* | 5/2017 | Matsumura | H04N 13/243 |
| 2017/0131722 A1* | 5/2017 | Hiramatsu | G01S 13/931 |
| 2018/0084708 A1* | 3/2018 | Neitemeier | A01B 69/001 |
| 2018/0321683 A1* | 11/2018 | Foster | G05D 1/0221 |
| 2020/0029488 A1* | 1/2020 | Bertucci | G05D 1/0248 |

FOREIGN PATENT DOCUMENTS

| CN | 109328631 A * | 2/2019 | A01D 45/002 |
| CN | 209343202 U * | 9/2019 | |
| DE | 102017122710 A1 | 4/2019 | |
| EP | 3491904 B1 * | 1/2022 | A01B 69/001 |
| EP | 4282260 A1 * | 11/2023 | A01K 5/02 |
| JP | 976850 A | 3/1997 | |
| JP | 10178815 A | 7/1998 | |
| JP | 11155340 A | 6/1999 | |
| JP | 3826563 B2 * | 9/2006 | |
| JP | 2018186728 A | 11/2018 | |
| JP | 20194771 A | 1/2019 | |
| JP | 2019170271 A * | 10/2019 | |
| WO | 2018235486 A1 | 12/2018 | |

* cited by examiner

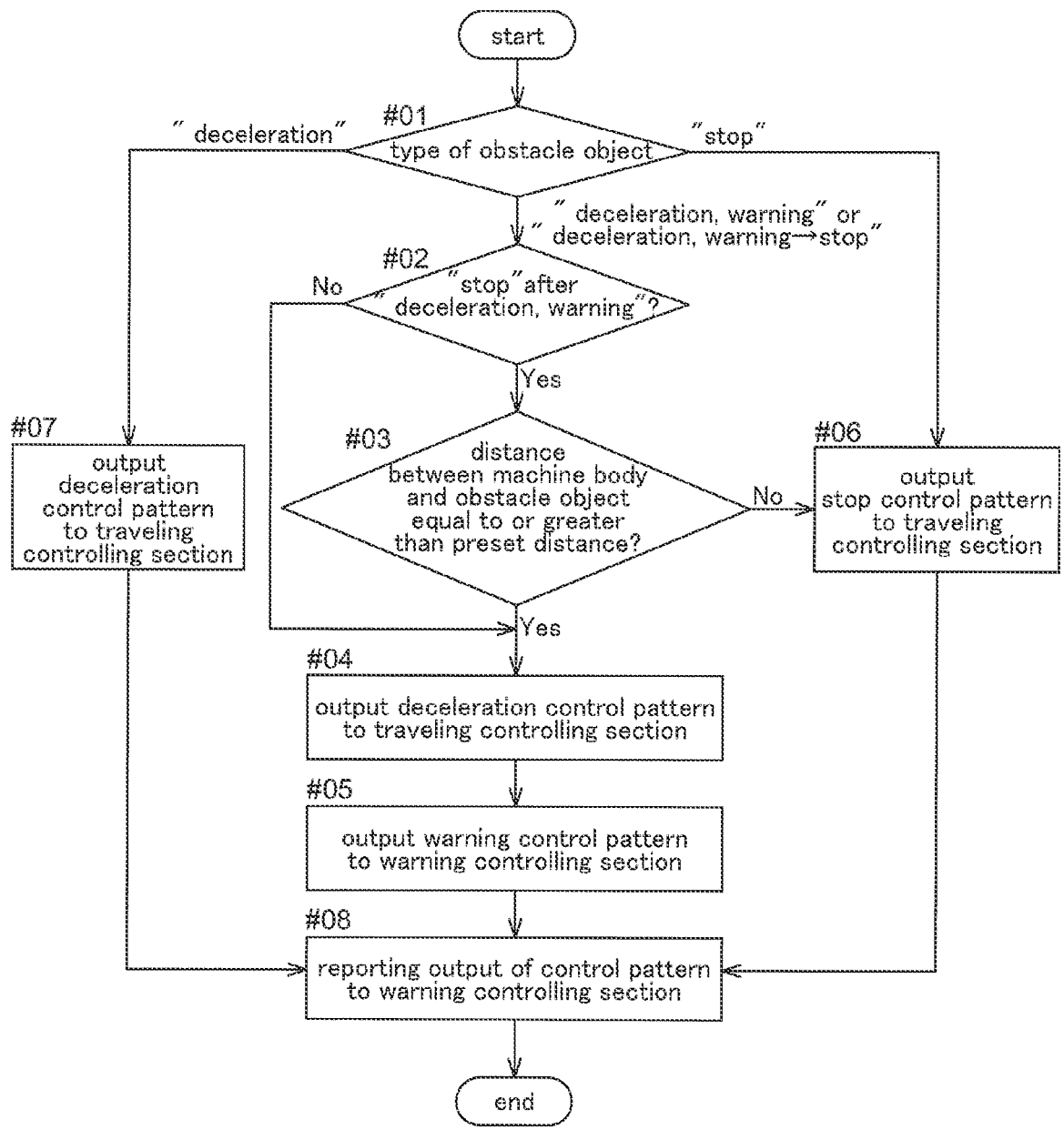

AGRICULTURAL WORK MACHINE SUCH AS HARVESTER

CROSS-REFERENCE TO RELATED APPLICATIONS

This application is the United States national phase of International Application No. PCT/JP2020/017734 filed Apr. 24, 2020, and claims priority to Japanese Patent Application Nos. 2019-083819 filed Apr. 25, 2019, and 2019-083821 filed Apr. 25, 2019, the disclosures of which are hereby incorporated by reference in their entirety.

BACKGROUND OF THE INVENTION

Field of the Invention

The present invention relates to an agricultural work machine such as a harvester.

Description of Related Art

Some harvesters are configured to harvest farm products while traveling autonomously in a field. Some of such harvesters have a function of observing conditions in the field and automatically taking such measure as stop of traveling if some abnormality is found in the field. The observation of the conditions in the field is done with use of a sensor such as a camera.

In an agricultural work in a field, it is necessary to pay attention to any condition in the field which is locally different within the field, or presence of a worker, etc. in the field. For this reason, an agricultural work machine disclosed in JP H11-155340A (Patent Document 1) for instance is equipped with an imaging device (a "TV camera" in Patent Document 1) capable of imaging the front side in the advancing direction. Based on an image imaged by the imaging device, a recognizing section (an "image processing device") can recognize the type of an obstacle object ("collapsed grain culm").

Patent Document 1: Japanese Unexamined Patent Application H11-155340A

SUMMARY OF THE INVENTION

As a problem relating to the prior art, there is a need for high-precision detection of abnormality in a field for the sake of higher performance of autonomous traveling.

The agricultural work machine disclosed in Patent Document 1 is configured to e.g. control an operation of a utility (work) implement based on presence of an obstacle object, but not configured to effect various controls based on the types of the obstacle object. Whereas, a situation needing implementation of various controls in accordance with the types of the obstacle object is conceivable. In view of such state of the art, there is a need for an agricultural work machine capable of effecting a suitable output control based on a control pattern appropriately selected in accordance with the type of the obstacle object from a plurality of control patterns, upon recognition of such obstacle object from an image imaged by an imaging device.

A solution addressing to the above issues is as follows.

A harvester configured to effect a work-performing traveling for harvesting agricultural products in a field while traveling in the field autonomously, the harvester comprising:

a traveling device effecting the work-performing traveling;

a machine body supported to the traveling device;

a harvesting section supported to a front portion of the machine body and harvesting the products in the field;

an imaging device provided at a front portion of the machine body and at a position higher than the harvesting section so as to view down a product present in an un-worked area located forwardly of the harvesting section;

a detecting section detecting abnormality in the field from an image imaged by the imaging device; and a controlling section executing an abnormality situation control as a control in accordance with the abnormality detected in the field.

With the above-described arrangement, an image can be captured with viewing down the field forwardly of the machine body from above. Thus, the recognition can be made based on bird's eye viewing of the field, so abnormality present in the field can be detected with high accuracy.

Further, as the controlling section takes an appropriate measure in accordance with the abnormality in the field and the work-performing traveling can continue appropriately.

According to one preferred embodiment, by inputting the image to a neural network machine-learned with using the deep learning technique, it is determined whether the abnormality in the field is presence of a foreign object or presence of weed or collapsing of the agricultural product.

With the above-described arrangement, the type of abnormality can be discriminated more easily and more accurately with use of artificial intelligence. Further, based on the discrimination of the type of abnormality, a more appropriate measure (abnormality situation control) in accordance with the type of abnormality can be effected and the appropriate work-performing traveling can be continued in a more reliable manner.

According to one preferred embodiment, in case the abnormality in the field is discriminated as presence of a foreign object, the controlling section decelerates or stops the machine body as the abnormality situation control.

In the case of traveling in an area where a foreign object is present, there is the possibility of damage or failure of the harvesting section and/or the machine body or impossibility to carry out a harvesting work appropriately. By decelerating or stopping the machine body in the case of detection (discrimination) of presence of a foreign object on a route of the work-performing traveling, accidental contact between the harvesting section or the machine body and the foreign object can be avoided. Or, by standing by without effecting work-performing traveling until such foreign object becomes non-existent, damage or failure of the harvesting section and/or the machine body can be avoided.

According to one preferred embodiment, the foreign object is an obstacle hidden among or between planting products.

It is difficult to discover an obstacle hidden among or between planting products. Then, by imaging the field from the above, such space or area between or among the products is easily checked. So, discovery of obstacle hidden among or between planted products is easy.

According to one preferred embodiment, if the abnormality in the field is discriminated as collapsing of the product, the controlling section decelerates the machine body as the abnormality situation control.

In the case of collapsing of the product, if the work-performing traveling is carried out as the same, i.e.

unchanged, speed, the product will be reaped with the product being not sufficiently raised. Thus, there will occur reaping mark difference between the case of collapsing of the product and the case of no collapsing of the product. Then, by decelerating the machine body if the abnormality in the field is discriminated as collapsing of the product, it becomes possible to raise the product sufficiently, thus rendering the reaping mark uniform.

According to one preferred embodiment:
the machine body includes:
  a threshing device threshing the harvested product;
  a conveying device conveying the harvested product from the harvesting section to the threshing device; and
  an adjusting section provided in the conveying device and configured to adjust a threshing depth of the product to be conveyed to the threshing device; and
  if the abnormality in the field is discriminated as presence of weed, the controlling section causes the adjusting section to suspend the threshing depth adjustment as the abnormality situation control.

A culm head charging type combine as one example of harvester is configured generally to be capable of adjusting a threshing depth depending on the length of the reaped culm. In general, if a weed longer than a farm product is conveyed, the threshing depth will be adjusted in accordance with the length of such weed, so the farm product will be threshed with too short threshing depth. This will result in inability for the threshing device to effect appropriate threshing treatment. For this reason, if the abnormality in the field is discriminated as presence of weed, the controlling section causes the adjusting section to suspend the threshing depth adjustment performed in accordance with the length of weed. With this, the threshing depth adjusted to the length of the product to be harvested immediately before the detection of the presence of the weed will be controlled to be maintained and the appropriate threshing treatment condition can be maintained.

According to one preferred embodiment, the machine body includes a driving section disposed at a front portion of the machine body and the imaging device is provided forwardly of the driving section.

With the above-described arrangement, as the imaging device is provided at the driving section which is relatively near the front end portion of the machine body and has high forward-side visibility, it becomes easier to view down the field and also to capture an image thereof starting from a relatively early timing. Thus, the image imaged over and beyond the harvesting section can readily include, within its range, the vicinity of the harvesting section and detection of abnormality and discrimination of the type of abnormality can be readily done at an appropriate position.

According to one preferred embodiment,
the machine body includes:
  a threshing device threshing the harvested product;
  a conveying device conveying the harvested product from the harvesting section to the threshing device;
  a grain tank for storing the threshed product;
  a vertical conveying section coupled to a lower portion of the grain tank;
  a horizontal conveying section coupled to an upper end portion of the vertical conveying section; and
  a discharging device capable of discharging the product stored in the grain tank from a discharging section provided at a leading end portion of the horizontal conveying section; and
  the imaging device is provided in the horizontal conveying section.

With the above-described arrangement, since the horizontal conveying section is provided in an area upwardly of the machine body, the imaging device provided in this horizontal conveying section can readily image the field from above.

According to one preferred embodiment:
  the discharging device is capable of selectively assuming a mode in which this discharging device is stored at a storage position and a mode which is assumed when the stored product is to be discharged and the discharging section protrudes from the machine body; and
  the autonomous traveling is effected only when the discharging device is stored at the storage position.

At the time of work-performing traveling, the discharging device will be moved to the storage position. Unless the discharging device is located at an appropriate position, an image captured thereby will be off its appropriate imaging range and abnormality detection cannot be carried out appropriately. For this reason, if the discharging device is not located at the storage position, the autonomous traveling is not effected and work-performing traveling is not effected. With this, control is possible to allow work-performing traveling to be effected with appropriate detection of abnormality being possible.

According to one preferred embodiment, there is provided a reporting section that issues a warning if the discharging device is away from the storage position at the time of autonomous traveling.

With the above-described arrangement, movement of the discharging device to the appropriate position is promoted and it becomes possible to cause the work-performing traveling to be effected with appropriate abnormality detection being possible.

Moreover, a system, a program, a recording medium and a method relating to the harvester described above are also encompassed within the scope of the present invention.

An abnormality control system for a harvester configured to control abnormality detected in a field when a harvester having a harvesting section supported to a front portion of the machine body carries out a work-performing traveling for harvesting farm products in the field while the harvester is effecting an autonomous traveling, the system comprising:
  a detecting section detecting the abnormality in the field from an image imaged by an imaging device configured to image from the above of a product present in an un-worked area forwardly of the harvesting section;
  a determining section determining the type of the abnormality; and
  a controlling section executing abnormality situation control in accordance with the determined type of the abnormality.

An abnormality control program for a harvester configured to control abnormality detected in a field when a harvester having a harvesting section supported to a front portion of the machine body carries out a work-performing traveling for harvesting farm products in the field while the harvester is effecting an autonomous traveling, the program causing a computer to realize:
  a detecting function detecting the abnormality in the field from an image imaged by an imaging device configured to image from the above of a product present in an un-worked area forwardly of the harvesting section;
  a determining function determining the type of the abnormality; and a controlling function executing abnormality situation control in accordance with the determined type of the abnormality.

A computer-readable recording medium recording therein an abnormality control program for a harvester configured to control abnormality detected in a field when a harvester having a harvesting section supported to a front portion of the machine body carries out a work-performing traveling for harvesting farm products in the field while the harvester is effecting an autonomous traveling, the program causing a computer to realize:
- a detecting function detecting the abnormality in the field from an image imaged by an imaging device configured to image from the above a product present in an un-worked area forwardly of the harvesting section;
- a determining function determining the type of the abnormality; and
- a controlling function executing abnormality situation control in accordance with the determined type of the abnormality.

An abnormality controlling method for a harvester configured to control abnormality detected in a field when a harvester having a harvesting section supported to a front portion of the machine body carries out a work-performing traveling for harvesting farm products in the field while the harvester is effecting an autonomous traveling, the method comprising:
- a step of detecting the abnormality in the field from an image imaged by an imaging device configured to image from the above a product present in an un-worked area forwardly of the harvesting section;
- a step of determining the type of the abnormality; and
- a step of executing abnormality situation control in accordance with the determined type of the abnormality.

A further solution addressing the prior art is as follows.

An agricultural work machine comprising:
- an imaging device capable of capturing an image of traveling direction front side of one or both of a forward traveling and a reverse traveling of a machine body in a field;
- a recognizing section capable of detecting presence of an obstacle object in the field and capable also of recognizing the type of the obstacle object, based on the captured image captured by the imaging device; and
- a pattern determining section determining one control pattern from a plurality of control patterns in accordance with the type of the obstacle object and executing an output control based on the determined control pattern.

Depending on the type of obstacle object, the significance thereof influencing the control of the agricultural work machine varies. According to the present invention, the type of the obstacle object is discriminated or identified as the recognizing section recognizes various kinds of objects from among image capturing candidates of the imaging device and various control patterns are provided in accordance with the type of the obstacle object. With this, in comparison with e.g. an arrangement in which the machine body is e.g. stopped uniformly based on presence of an obstacle object in the field, the agricultural work by the agricultural work machine can be carried out in an efficient manner without being interfered by the obstacle object. Namely, with the present invention, there is realized an agricultural work machine configured such that when the obstacle object is recognized and discriminated based on a captured image thereof captured by the imaging device, a favorable output control is possible based on a control pattern appropriately selected based on the type of the obstacle object from among a plurality of control patterns.

According to a preferred embodiment, the recognizing section is configured to be able to recognize the type of the obstacle object with utilization of a neural network learned with use of the deep learning technique.

With the above-described arrangement, a neutral network is used for the recognition of the type of the obstacle object and a captured image captured by the imaging device is utilized as input data to the neural network. It is known that the neural network can recognize an input-output relation having a non-linear characteristics by the deep learning technique. Therefore, with the utilization of such neural network by the recognizing section, it becomes possible to improve the accuracy of the recognition of the type of the obstacle object.

According to a further preferred embodiment, the plurality of control patterns include deceleration of the machine body, stop of the machine body and warning against the obstacle object.

With the above-described arrangement, in accordance with the type of the obstacle object, such actions as stop of the machine body, adjustment of speed of the machine body and warning against the obstacle object can be carried out smoothly, and the agricultural work by the agricultural work machine can be carried out in an efficient manner.

According to a still further preferred embodiment, if the recognizing section recognizes that the obstacle object is of a non spontaneously moving type, the pattern determining section determines the control pattern relating to the stop of the machine body.

In case the obstacle object is of the non spontaneously moving type, there arises a need to avoid contact between the machine body and the obstacle object. With the inventive arrangement described above, the control pattern relating to the stop of the machine body will be determined and the pattern determining section will effect an output control to stop the machine body. Thus, contact between the machine body and the obstacle object can be avoided appropriately.

According to a still further preferred embodiment, if the recognizing section recognizes that the obstacle object is of a spontaneously moving type, the pattern determining section determines the control patterns relating to the deceleration of the machine body and the warning against the obstacle object.

In case the type of the obstacle object is a spontaneously moving type object such as an animal, e.g. a cattle, a bird or animal, with the inventive arrangement described above, it becomes possible to chase away the obstacle object present on the advancing direction front side by effecting only deceleration of the machine body and warning against the obstacle object. With this, forward traveling or reverse traveling of the machine body can be carried out smoothly, without stopping of the machine body.

According to a further preferred embodiment:
- there is provided a distance sensor capable of determining a distance between the machine body and the obstacle object; and
- the pattern determining section determines the control pattern relating to the stop of the machine body if the distance becomes equal to or less than a preset distance.

Even when an obstacle object is present, this may not present any problem for traveling of the machine body as long as there is a sufficient distance between the machine body and the obstacle object. For instance, if the obstacle object is a spontaneously moving animal or the like, if the machine body is away from the obstacle object, it may be assumed that the machine body need not stop, and the obstacle object can be chased away by only issuing a warning against this obstacle object. With the inventive arrangement described above, the distance between the machine body and the obstacle object can be determined by the distance sensor, so it is possible to e.g. stop the machine body only when the risk of accidental contact between the machine body and the obstacle object has increased sufficiently, without stopping the machine body unnecessarily. With this, an efficient control of the agricultural work machine is made possible. Incidentally, in the present invention, the above language "if the distance becomes equal to or less than a preset distance" includes the case of the distance falling below the preset distance.

In the present invention, preferably, the distance sensor comprises a sonar.

Since it is known that a sonar is cost-advantageous, with the above arrangement, there can be realized a distance sensor which is cost-advantageous.

According to a further preferred embodiment, the distance sensor comprises an LIDAR. Namely, the distance sensor comprises preferably a distance sensor utilizing the LIDAR (Light Detection and Ranging) technique.

Further, the distance sensor may also comprise a laser scanner advantageously.

It is known that LIDAR or a laser scanner as a form of LIDAR has a higher accuracy in distance determination as compared with a sonar, etc. Thus, with the above-described arrangement, there is realized a distance sensor advantageous in the respect of accuracy. Further, if the LIDR or the laser scanner is configured to be capable of scanning not only the front and left and right sides, but also the vertical direction in the three-dimensions, it becomes possible to extend the distance determination range than the two-dimension scanning type LIDAR or laser scanner.

Moreover, a system, a program, a recording medium and a method relating to the agricultural work machine described above are also encompassed within the scope of the present invention.

A control system for an agricultural work machine executing an output control for an obstacle object present in a field based on an image captured by an imaging device capable of capturing an image of traveling direction front side of one or both of a forward traveling and a reverse traveling of a machine body when the agricultural work machine travels in the field, the control system comprising:
   a recognizing section capable of detecting presence of an obstacle object in the field and capable also of recognizing the type of the obstacle object, based on the captured image captured by the imaging device; and
   a pattern determining section determining one control pattern from a plurality of control patterns in accordance with the type of the obstacle object and executing an output control based on the determined control pattern.

A program executing an output control for an obstacle object in a field, based on an image captured by an imaging device capable of capturing an image of traveling direction front side of one or both of a forward traveling and a reverse traveling of a machine body when the agricultural work machine travels in the field, the program causing a computer to realize:
   a function of detecting presence of an obstacle object in the field, based on the captured image;
   a function of recognizing the type of the obstacle object, based on the captured image;
   a function of selecting a control pattern from a plurality of control patterns, in accordance with the type of the obstacle object; and
   a function of executing the output control based on the control pattern.

A computer-readable recording medium recording a program executing an output control for an obstacle object in a field, based on an image captured by an imaging device capable of capturing an image of traveling direction front side of one or both of a forward traveling and a reverse traveling of a machine body when the agricultural work machine travels in the field, the program causing a computer to realize:
   a function of detecting presence of an obstacle object in the field, based on the captured image;
   a function of recognizing the type of the obstacle object, based on the captured image;
   a function of selecting a control pattern from a plurality of control patterns, in accordance with the type of the obstacle object; and
   a function of executing the output control based on the control pattern.

A control method for an agricultural work machine executing an output control for an obstacle object in a field, based on an image captured by an imaging device capable of capturing an image of traveling direction front side of one or both of a forward traveling and a reverse traveling of a machine body when the agricultural work machine travels in the field, the method comprising:
   a step of detecting presence of an obstacle object in the field, based on the captured image;
   a step of recognizing the type of the obstacle object, based on the captured image;
   a step of selecting a control pattern from a plurality of control patterns, in accordance with the type of the obstacle object; and
   a step of executing the output control based on the control pattern.

Further and other features and advantages and effects achieved thereby will become apparent upon reading the following explanation.

BRIEF DESCRIPTION OF THE DRAWINGS

FIG. 11 is an explanatory view showing relation between an obstacle object and a control pattern, and FIG. 12 is a flowchart showing output controls based on control patterns.

DETAILED DESCRIPTION OF PREFERRED EMBODIMENTS

First Embodiment

In a first embodiment, an explanation will be made with citing a normal type combine as one example of a harvester relating to the present invention. This combine is referred to also as a "whole culm charging type combine".

Incidentally, in this detailed description, unless explicitly indicated otherwise, the word "front" (direction denoted by arrow F in FIG. 1) means the front side in the vehicle body front-rear direction (traveling direction), and the word "rear" (direction denoted by arrow B in FIG. 1) means the rear side in the vehicle body front-rear direction (traveling direction). Further, the left-right direction or the transverse direction refer to the vehicle body transverse direction (vehicle body width direction) which is orthogonal to the vehicle body front-rear direction. And, the word "upper" (the direction denoted by arrow U in FIG. 1) and the work "lower" (the direction denoted by arrow D in FIG. 1) refer to the positional relationship in the perpendicular direction (vertical direction) of the machine body, representing the relationship in the level from the ground.

(General Arrangement)

Figure 1:
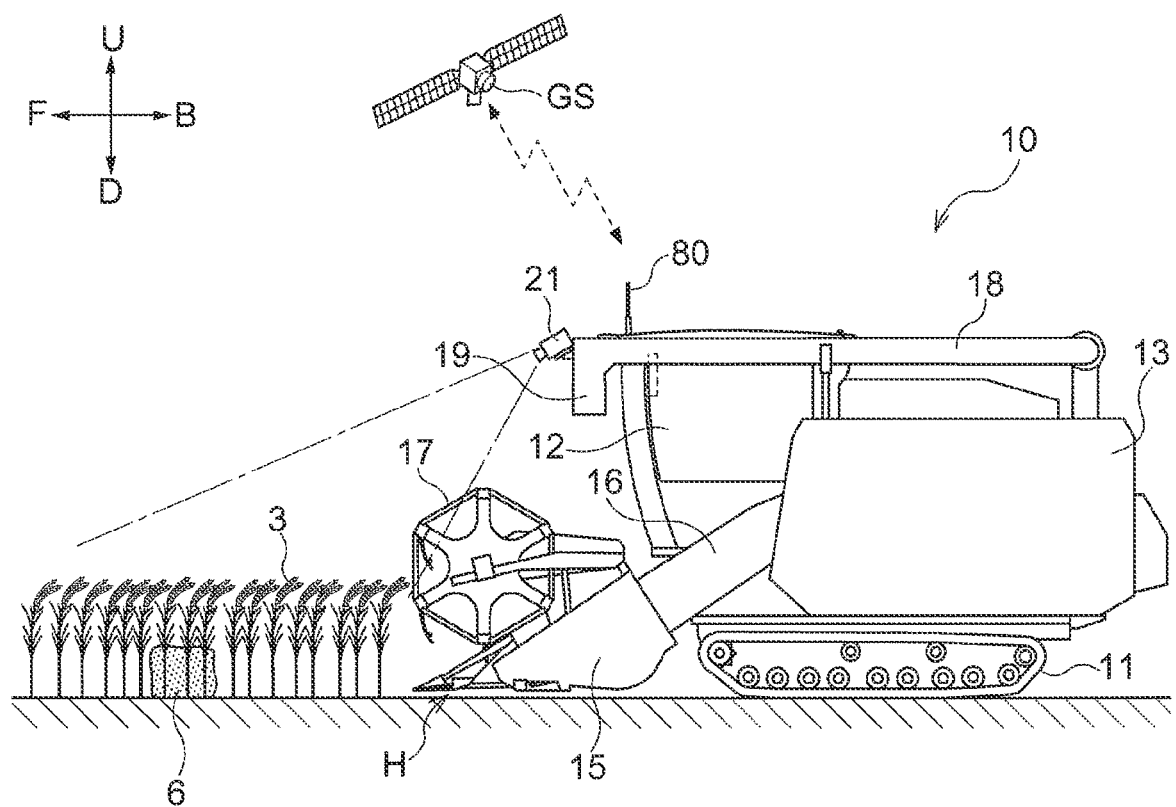
FIG. 1 is a view showing a first embodiment (also applied to the following drawings up to FIG. 5) which is a side view of a combine as one example of a harvester.

As shown in FIG. 1, in this combine, a machine body 10 is supported to a crawler type traveling device 11. The machine body 10 includes a driving section 12, a threshing device 13, a grain tank 14, a harvesting section H, a conveying device 16, a discharging device 18 and a self-vehicle position detecting module 80.

The combine is configured to be self-propelled by the traveling device 11. This traveling device 11 is a steering traveling device consisting of a pair of left and right crawler mechanisms and controlled by a traveling controlling section 35 (see FIG. 5 to be described later). The crawler speed of the left crawler mechanism and the crawler speed of the right crawler mechanism are adjustable independently of each other, and through adjustment of a speed difference therebetween the orientation or direction in the traveling direction of the machine body 10 is changed. The driving section 12, the threshing device 13, and the grain tank 14 are provided on the upper side of the traveling device 11 and together constitute an upper section of the machine body 10. At the driving section 12, a driver who drives the combine or a monitoring person who monitors the work of the combine can ride. Normally, a driver acts also as a monitoring person. Incidentally, in case the driver and the monitoring person are different persons, the monitoring person may monitor the work of the combine from the outside of the machine body of the combine.

The harvesting section H is provided at a front portion of the combine. And, the conveying device 16 is connected to a rear side portion of the harvesting section H. Further, the harvesting section H includes a cutting mechanism 15 and a reel 17. The cutting mechanism 15 cuts a planting culm (corresponding to a "(farm) product") in the field. And, the reel 17 rakes in the planting culm as the harvesting target while being rotatably driven. With this arrangement, the harvesting section H harvests a crop of the field (a kind of (farm) product). And, the combine is capable of effecting a work-performing traveling in which the combine travels by the traveling device 11 while harvesting the crop of the field by the harvesting section H.

The whole culm of the harvested culm reaped by the cutting mechanism 15 is conveyed by the conveying device 16 to the threshing device 13. In this threshing device 13, the reaped culm is subjected to a threshing treatment. The grain obtained by the threshing treatment is stored in the grain tank 14. The grain stored in the grain tank 14 is discharged to the outside of the machine body by the discharging device 18.

The discharging device 18 is coupled to a rear lower portion of the grain tank 14. The discharging device 18 includes a vertical conveying section having one end thereof connected to a lower portion of the grain tank 14 and a horizontal convening section. The horizontal conveying section has one end thereof coupled to an upper portion of the vertical conveying section and the other end thereof provided with a discharging section 19. Grains stored in the grain tank 14 are discharged from the discharging section 19 to e.g. a transporter vehicle (not shown). The discharging device 18 is displaceable between a discharging state (protruding state) and a storage state (stored state). At time of work-performing traveling, the discharging device 18 will be maintained at a storage position and stored in an upper region of the machine body 10 (stored state). Also, at the time of discharging grains, the discharging device 18 will be displaced to the mode (discharging state) in which the discharging state 19 protrudes to the lateral side of the machine body 10 for discharging the grains. Further, the self-vehicle position detecting module 80 is attached to a front upper portion of the driving section 12.

At a front portion or a lateral portion of the discharging section 19, a camera 21 (corresponding to an "imaging device") for imaging or capturing an image of the forward area where the machine body 10 is to effect the work-performing traveling. For instance, with provision of a camera 21 designed to provide an imaging range for 190 degrees in the horizontal direction and 60 degrees in the vertical direction, it becomes possible to capture an image of the forward side of the machine body 10 in a field from the above sufficiently. The camera 21 may be provided at the discharging section 19 with such orientation toward the forward side of the machine body 10 when the discharging device 18 is set under the storage state. And, this camera 21 may be attached via e.g. a stay (not shown) to a forwardly protruding corner of the discharging section 19.

In the driving section 12, a communication terminal 2 is disposed. In this embodiment, the communication terminal 2 is fixed to the driving section 12. However, the present invention is not limited thereto. Alternatively, the communication terminal 2 may be configured to be detachably attached to the driving section 12. Further alternatively, the communication terminal 2 may be configured to be carried out of the machine body of the combine.

[Autonomous Traveling]

Figure 2:
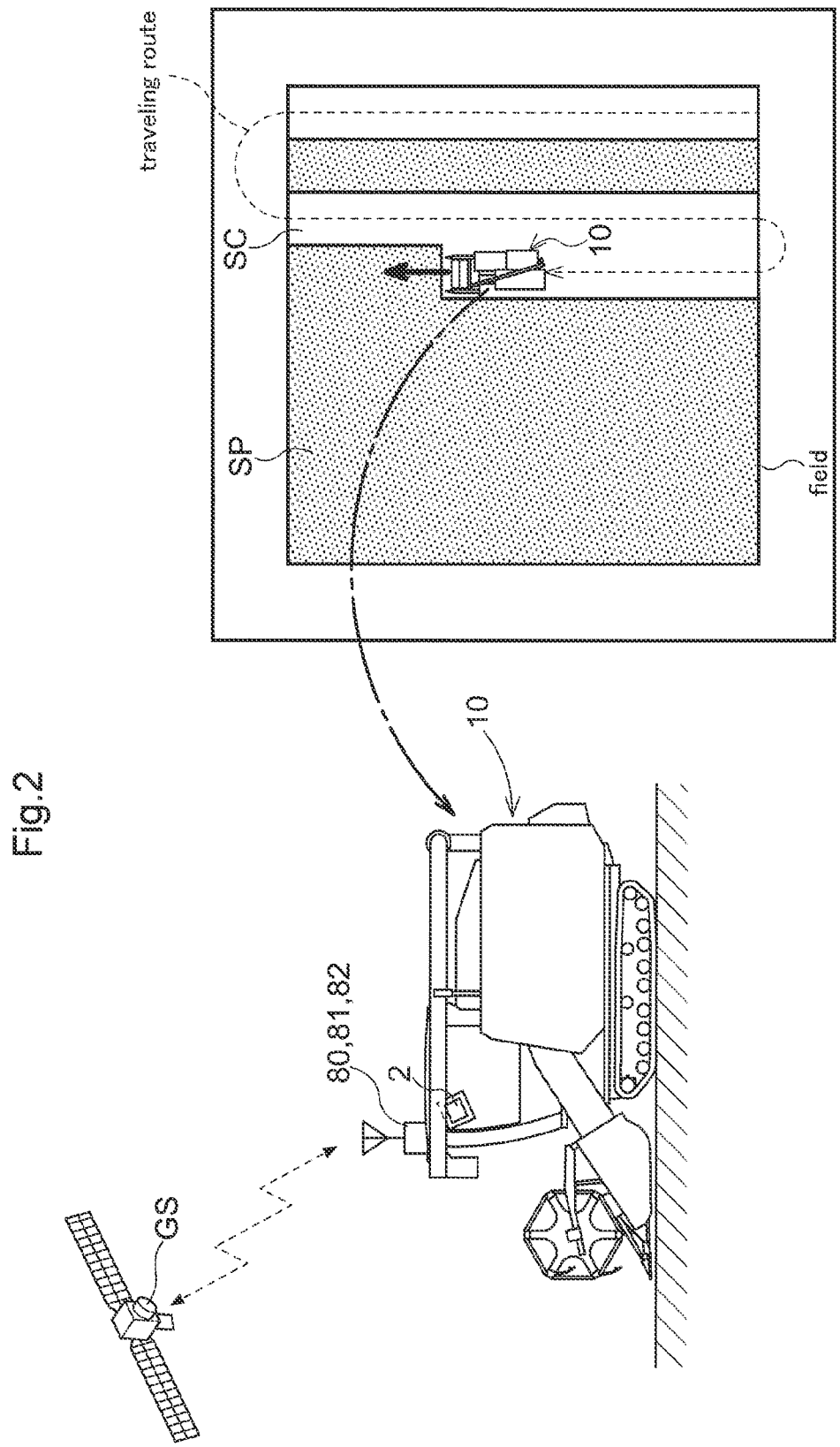
FIG. 2 is a view for explaining an outline of an autonomous traveling of the combine.

As illustrated in FIG. 2, this combine effects autonomous travel along a traveling route set in a field. To this end, a self-vehicle position is needed. The self-vehicle position detecting module 80 includes a satellite navigation module 81 and an inertial navigation module 82. The satellite navigation module 81 receives GNSS (Global Navigation Satellite System) signals (including GPS signals) from an artificial satellite GS and outputs positioning data for calculating a self-vehicle position. The inertial navigation module 82 incorporates a gyro acceleration sensor and a magnetic azimuth sensor and outputs a position vector indicative of an instantaneous traveling direction. The inertial navigation module 82 is used for complementing the self-vehicle calculation by the satellite navigation module 81. The inertial navigation module 82 may be disposed at a separate location from the satellite navigation module 81.

The circumference of the field is formed and obtained by orbiting the field circumference as appropriate and the obtained circumference is set as a turning area, based on which the work-performing traveling of an un-worked area SP is effected. The area in which the work-performing traveling is completed will be set as a worked area SC.

[Abnormality in Field]

Figure 3:
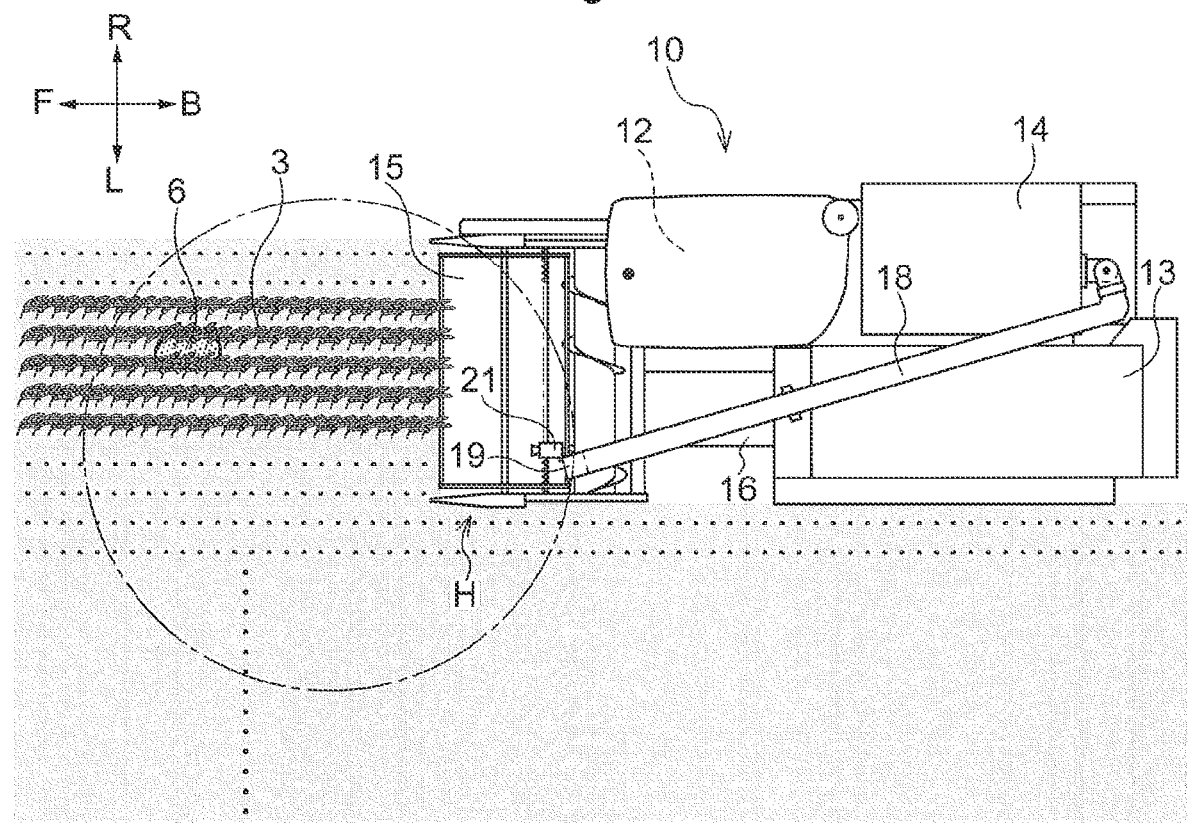
FIG. 3 is a plan view illustrating a work-performing traveling in a field.

In case an abnormality 6 as shown in FIG. 3 is present in the field, if work-performing traveling is effected in an area where the abnormality is present, the work will not be carried out appropriately in many cases. For instance, as examples of abnormality 6 in the field, there can be cited presence of a foreign object 7 (an obstacle, a person, an animal, etc.) or collapsing 9 of planting culm 3. Such foreign object 7 will be hidden between planting rows formed of planting culms 3 aligned in a plurality of rows and the foreign object 7 can be e.g. an obstacle which can be an obstacle in the work-performing traveling.

Figure 4:
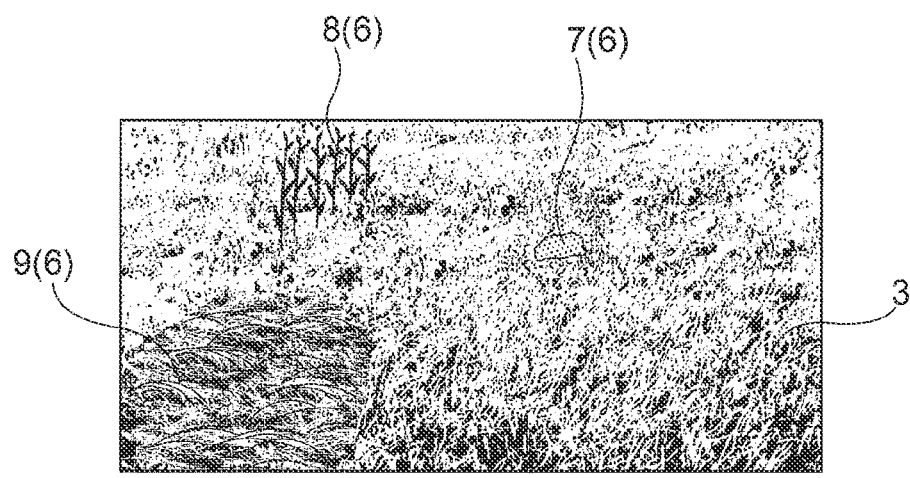
FIG. 4 is a view illustrating a captured image.

As shown in FIG. 3 and FIG. 4, if the machine travels in the area where the foreign object 7 is present, accidental contact can occur between the harvesting section H or the machine body 10 and the foreign object 7, resulting in breakage or damage in the harvesting section H or the machine body 10 or inability to carry out a harvesting work appropriately. And, if the machine travels in an area where collapsing 9 of the planting culm 3 is present, the harvesting section H may not rake and raise the planting culms 3 sufficiently. Then, in comparison with a case of such collapsing 9 being non-existent, there will be formed a longer reaping mark. Thus, there occurs irregularity of reaping mark between the case of presence of collapsing 9 and the case of non-presence of collapsing 9.

[Imaging of Field]

Next, an arrangement for detecting the abnormality 6 in a field will be explained with reference to FIGS. 2-4.

In order to detect the field abnormality 6 described above and recognize the type (contents) of the field abnormality 6, the camera 21 images, i.e. captures an image of the field forwardly of the machine body 10. The imaging range of the camera 21 is an area forwardly of the machine body 10 or the harvesting section H and viewing the planting culms 3 from the above. The captured image will include tips of the planting culms 3 aligned in the plurality of rows and the inter-row spaces. The width of the image is at least the width of the machine body 10 or the harvesting section H and includes the area passed by the harvesting section H in the work-performing traveling. Referring to the length of the image, one end portion thereof is positioned by a predetermined distance (e.g. 1 m) forwardly of the harvesting section H and the other end portion thereof is positioned by 5 m to 6 m forwardly of the harvesting section H. Incidentally, preferably, the image includes not only the area passed by the harvesting section H, but also a part of the un-worked area located on the lateral side thereof.

[Controlling Device]

The harvester of this embodiment effects at least one of detection of the field abnormality 6 and determination or discrimination of the type of the field abnormality 6 and can effect also abnormality situation control as a measure to be taken therefor in accordance with the abnormality 6. These actions, i.e. the detection, the discrimination, the control are effected by a controlling device 25 shown in FIG. 5 which is mounted on the harvester.

Figure 5:
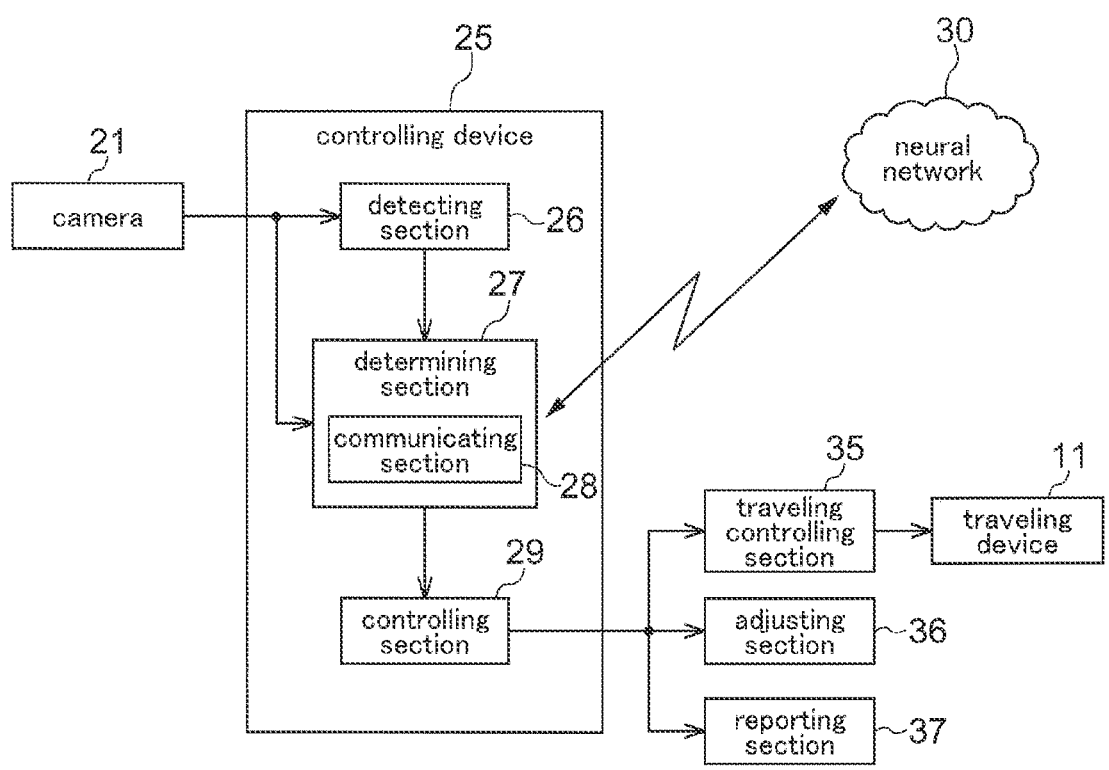
FIG. 5 is a block diagram illustrating a functional arrangement for detecting abnormality in a field.

As shown in FIG. 5, the controlling device 25 includes a detecting section 26, a determining section 27 and a controlling section 29. The controlling device 25 is constituted of a hardware including a processor such as a CPU, an ECU, etc. and can be divided into a plurality of functional blocks. Further, some or a part of the functions of the controlling device 25 can be realized by a software. In this case, such software will be stored in an illustrated storage section and will be executed by the controlling device 25 or other processor.

As shown in FIGS. 3-5, the detecting section 26 acquires the image captured by the camera 21 and effects an image analysis thereof, thus detecting presence of the abnormality 6 in the field. The detecting section 26 transmits the result of the detection of the presence of the field abnormality 6 to the controlling section 29.

As described above, the image captures the planting culms 3 from the above, so an image of even an obstacle or the like hidden in the inter-row space can be readily obtained and detected. In particular, as the camera 21 is provided in the discharging section 19 of the discharging device 18, the camera 21 will be disposed at an upper portion of the machine body 10 and at a front portion of the machine body 10 near the harvesting section H. Therefore, the camera 21 can capture the image of the area forwardly of the machine body 10 near the harvesting section H at an angle nearly right above the area. As a result, the camera 21 can image more easily an obstacle or the like hidden in the inter-row space.

The detecting section 26 can detect presence/absence of the abnormality 6, but it is difficult for this detecting section 26 to discriminate the type of the abnormality 6. For this reason, the determining section 27 obtains the image captured by the camera 21 and discriminates the type of the abnormality 6. For instance, the determining section 27 inputs the obtained image to a neural network 30 and causes the type of the abnormality 6 to be determined in the neural network 30. The determining section 27 includes a communicating section 28 and transmits the image from this communicating section 28 via e.g. a network or the like to the neural network 30 and receives the result of the determination therefrom. The neural network 30 has inputted predetermined teaching data, thus being machine-learned in advance. So, based on learned data generated by the machine learning, the type of the abnormality 6 will be discriminated or determined from the inputted image. Such machine learning is possible by the deep learning technique for instance. Then, the determining section 27 transmits the result of determination on the type of the field abnormality 6 to the controlling section 29. Incidentally, the neural network 30 may be provided on the network, but may be included in the controlling device 25 alternatively.

The controlling device 25 can be configured to execute an abnormality situation control as a control in accordance with the abnormality 6 as a counter measure in accordance with the result of determination on the type of the abnormality 6. In this case, the controlling section 29 executes the abnormality situation control. For instance, if the determining section 27 determines the type of the abnormality 6 at a location forward by a distance equal to or more than 1.5 m and equal to or less than 6 m of the machine body 10, the controlling section 29 can control various counter measures including stopping of the machine body 10.

If the type of the abnormality 6 determined by the determining section 27 is presence of a foreign object 7, the controlling section 29 will control the traveling controlling section 35 to stop or decelerate the machine body 10 via the traveling device 11. By stopping the machine body 10, accidental contact between the harvesting section H or the machine body 10 and the foreign object 7 can be avoided, so damage or failure of the harvesting section H or the machine body 10 can be avoided. In particular, as the camera 21 is provided at a high position upwardly of the harvesting section H and forwardly of the machine body 10, there will be used an image which is captured from above the area forwardly of the harvesting section H or near the harvesting section H, with good visibility of the inter-row space of the field present on the forward side in the work-performing traveling, whereby even a foreign object 7 hidden in the inter-row space can be discovered easily. By decelerating the machine body 10, it becomes easier to take such measure as switching over to the manual travel to travel with avoiding the foreign object 7. Further, in some cases, it become possible to obtain some spare time for the foreign object 7 to disappear until the machine body 10 reaches the foreign object 7.

If the type of abnormality 6 determined by the determining section 27 is collapsing 9 of planting culm 3, then the controlling section 29 controls the traveling controlling section 35 to stop or decelerate the machine body 10 via the traveling device 11. In case the planting culm 3 is collapsed, if the work-performing traveling is continued at the same unchanged speed, the planting culm 3 will be reaped without this planting culm 3 being raised sufficiently. So, there will occur difference or irregularity of reaping mark between the case of the planting culm 3 being collapsed and the case of the planting culm 3 being not collapsed. For this reason, in the case of the planting culm 3 being collapsed, it is necessary to reduce the traveling speed in order to raise the planting culm 3 sufficiently. Then, in the case of collapsing 9 of the planting culm 3, as the controlling section 29 decelerates the machine body 10, the planting culm 3 can be raised sufficiently and the reaping mark can be formed uniform. Similarly, by stopping the machine body 10, control may be made to cause the work-performing traveling to proceed at an appropriate speed thereafter, so the reaping mark can be formed uniform.

In this way, by disposing the camera 21 at a position on the frontside of the machine body 10 and at as high as position at least higher than the harvesting section H, the area where the work-performing traveling is to be effected will be imaged from a position upwardly of the planting culm 3 and as near as possible to the position right above the planting culm 3, whereby the field abnormality 6 can be detected with high accuracy. Further, if the camera 21 is provided at a position forwardly of or right above the harvesting section H, or at a position rearwardly, yet on the front side of the machine body 10 as close as possible to the harvesting section H, the forward side of the harvesting section H will be imaged without being interfered by the harvesting section H, so the field can be imaged from a position closer to the position right above the field, and the field abnormality 6 can be detected with high accuracy. Further, as the field is imaged in such a manner as to command a top-down view on the planting culm 3, the abnormality 6 hidden in the inter-row space can be detected easily.

Further, with the determination (discrimination) of the type of the field abnormality 6, the abnormality situation control is executed as a counter measure appropriate in accordance with the type of the abnormality 6, whereby the work-performing traveling can be carried out continuously appropriately.

Further Embodiments of First Embodiment (1) The position where the camera 18 is provided is not limited to the discharging device 21, but may be an area of the front portion of the machine body 10. In this case, it is preferred that the camera 21 be provided at a position on more front side than the driving section 12. Namely, advantageously, the camera 21 should be provided at a level sufficiently higher than a level of the harvesting section H, at a position which is on as front as possible of the machine body 10, and at which the un-worked area SP forwardly in the work-performing traveling direction of the harvesting section H can be imaged from above. For instance, a stay may be provided to protrude forwardly from the machine body 10 and the camera 21 may be attached to this stay. With this, the field can be imaged as if viewed down from above and discovery of the abnormality 6 is made easier. Further, the camera 21 can be made movable and can be configured to vary its imaging range depending on the work situation or field situation.

(2) If a camera for discharging (not shown) is to be provided for confirmation of a discharging state when grains are discharged from the discharging device 18, the camera 21 may be used also as such discharging camera (not shown). In this case, the imaging range of the camera 21 (discharging camera) will be switched over such that the camera will capture an image of the periphery of the discharging section 19 at the time of grain discharging and will capture an image of the un-worked area SP forwardly of the harvesting section H at the time of work-performing traveling.

(3) The field abnormality 6 may include presence of weed 8. In this respect, a culm head charging type combine has the conveying device 16 generally equipped with a sensor (not shown) for detecting the length of the harvested reaped culm. Further, the conveying device 16 will be equipped with an adjusting section 36 for adjusting a threshing depth in accordance with the detected length of the reaped culm at the time of threshing treatment of the reaped culm in the threshing device 13. With provision of this adjusting section 36, the threshing device 13 can carry out an appropriate threshing treatment, with taking the length of the reaped culm into consideration.

In case such culm head charging type combine effects work-performing traveling in an area where a weed 8 longer than the planting culm 3 is present, the adjusting section 36 of the conveying device 16 will adjust the threshing depth in accordance with the length of the weed 8. As a result, the planting culm 3 as the subject of threshing will be threshed with too short depth, so the threshing treatment may not be carried out appropriately.

Then, with the harvester relating to this embodiment, if the type of the abnormality 6 determined by the determining section 27 is presence of weed 8, the controlling section 29 will control the adjusting section 36 so as not to effect the adjustment of threshing depth. The threshing depth will be adjusted in accordance with the length of the planting culm 3 being conveyed. In case the weed 8 is conveyed, the threshing depth will be adjusted in accordance with the length of the weed 8. As a result, the planting culm 3 as the threshing subject will be threshed with too short threshing depth and appropriate threshing treatment will not be effected in the threshing device 13. For this reason, in case the abnormality 6 is determined as presence of weed 8, the controlling section 29 will suspend the threshing depth adjustment so that the threshing depth adjusted in accordance with the length of the planting culm 3 at the time of non-presence of weed 8 may be maintained. With this, the appropriate threshing treatment will be maintained.

(4) The determining section 27 may be configured to effect determination on the foreign object 7 with distinction of a human or an animal including a human. In this case, if the determining section 27 determines presence of a human or an animal in the advancing direction of the machine body 10, the controlling section 29 will cause a reporting section 37 to issue a warning and then stop the machine body 10. In case such human or animal is present at a position faraway to some extent, the alarm may cause the human or animal to retreat. In case the human or animal still remains in the advancing direction in spite of issuance of warning, the controlling section 29 will stop the machine body 10 when the distance between the machine body 10 and the human or animal becomes closer to a predetermined distance or a certain time has lapsed after the issuance of warning. Incidentally, in case presence of a human is determined, the controlling section 29 may stop the machine body 10 immediately. With the above-described measures, contact between the machine body 10 and the human or animal can be avoided.

(5) The determining section 27 may determine presence of a sluice. A sluice is an inlet for drawing water into the field. In many cases, such sluice is hidden by the planting culm 3 and discovery thereof is difficult with a standard sensor. Since the camera 21 used in the foregoing respective embodiments images the field from above, such sluice hidden by the planting culm 3 can be discovered easily. If the determining section 27 determines presence of sluice, the controlling section 29 can take such measure as causing the reporting section 37 to issue a warning, stopping the machine body 10 through control of the traveling controlling section 35 or circumventing the sluice, etc. As such sluice is provided in an outer circumferential area of the field, work-performing traveling may often be carried out in the circumference of the sluice at the time of circumference cutting of the field. For this reason, preferably, in case the foreign object 7 is a sluice, the abnormality situation control is effected not only in the autonomous travel, but also in the manual travel. If the determining section 27 determines presence of a sluice at the time of manual travel, the controlling section 29 will cause a reporting section 37 to issue a warning and the worker will carry out the work-performing traveling with circumventing the sluice by manual traveling, with confirmation of the sluice. With the above, even when a sluice is present, work-performing traveling can be carried out appropriately.

(6) In the foregoing respective embodiments, the controlling device 25 includes the detecting section 26 and the determining section 27. However, if the type of the abnormality 6 is determined by the determining section 27, this means that detection of the presence of the abnormality 6 is done as well. Thus, the detecting section 26 is not absolutely needed. Further, in case the controlling device 25 includes both the detecting section 26 and the determining section 27, it may be arranged such that triggered by detection of the abnormality 6 by the detecting section 26, the determining section 27 proceeds to determine the type of the abnormality 6. Further, in case determination of the type of the abnormality 6 is not necessary, the controlling device 25 will include at least the detecting section 26. Further, rather than providing the detecting section 26 and the determining section 27 separately, without provision of the determining section 27, the detecting section 26 may be equipped with the communicating section 28, so that the type of the abnormality 6 may be determined in the detecting section 26.

(7) In the foregoing respective embodiments, as the self-vehicle position detecting module 80, the combination of the satellite navigation module 81 and the inertial navigation module 82 is employed. Instead, only the satellite navigation module 81 may be provided. Further alternatively, it is possible to employ a technique of effecting calculations of the self-vehicle position and the azimuth based on the image captured by the camera.

(8) The harvester relating to the present invention is not limited to the standard type combine, but may be applied also to the culm head charging type combine. Further, the present invention is applicable also to a variety of harvesters, such as a cone harvester, a potato harvester, a carrot harvester, a sugarcane harvester, etc.

(9) Further, a system, a program, a recording medium and a method relating to the above-described harvester are also encompassed within the scope of the present invention. For instance, the scope of the present invention includes also an abnormality control system, an abnormality control method and an abnormality control program, a computer-readable recording medium recording such abnormality control program, for a harvester configured to control abnormality in a field detected when a harvester having a harvesting section supported to a front portion of the machine body effects work-performing traveling to harvest farm products in the field while the harvester effects autonomous travel.

(10) Incidentally, the arrangement disclosed in the foregoing embodiment (including the modified embodiments) can be used in combination with the arrangements disclosed in the other embodiments, unless no contradiction results from such combination. Further, it is understood that the embodiments disclosed in this detailed description are only illustrative, and embodiments of the present invention are not limited thereto, but various modifications thereof can be made appropriately within the range not deviating from the essence of the present invention.

Second Embodiment

Figure 6:
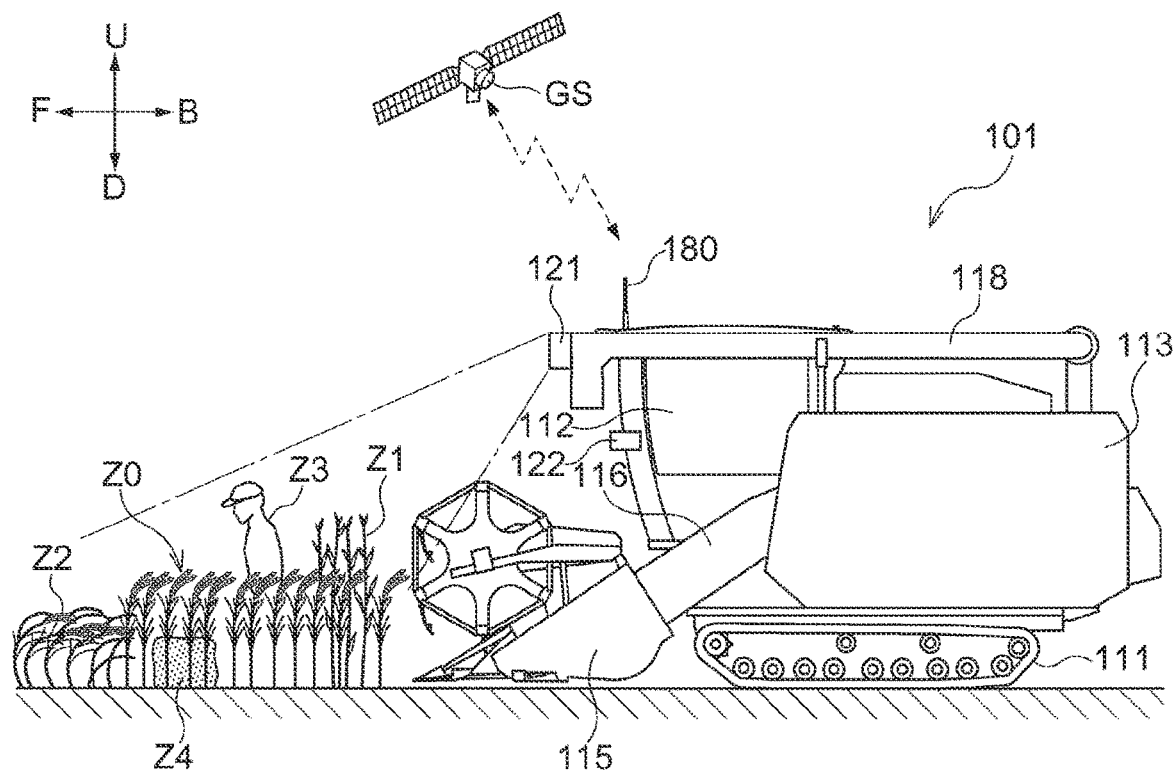
FIG. 6 is a view showing a second embodiment (also applied to the following drawings up to FIG. 12) which is an overall side view showing a combine as one example of an agricultural work machine.
Figure 7:
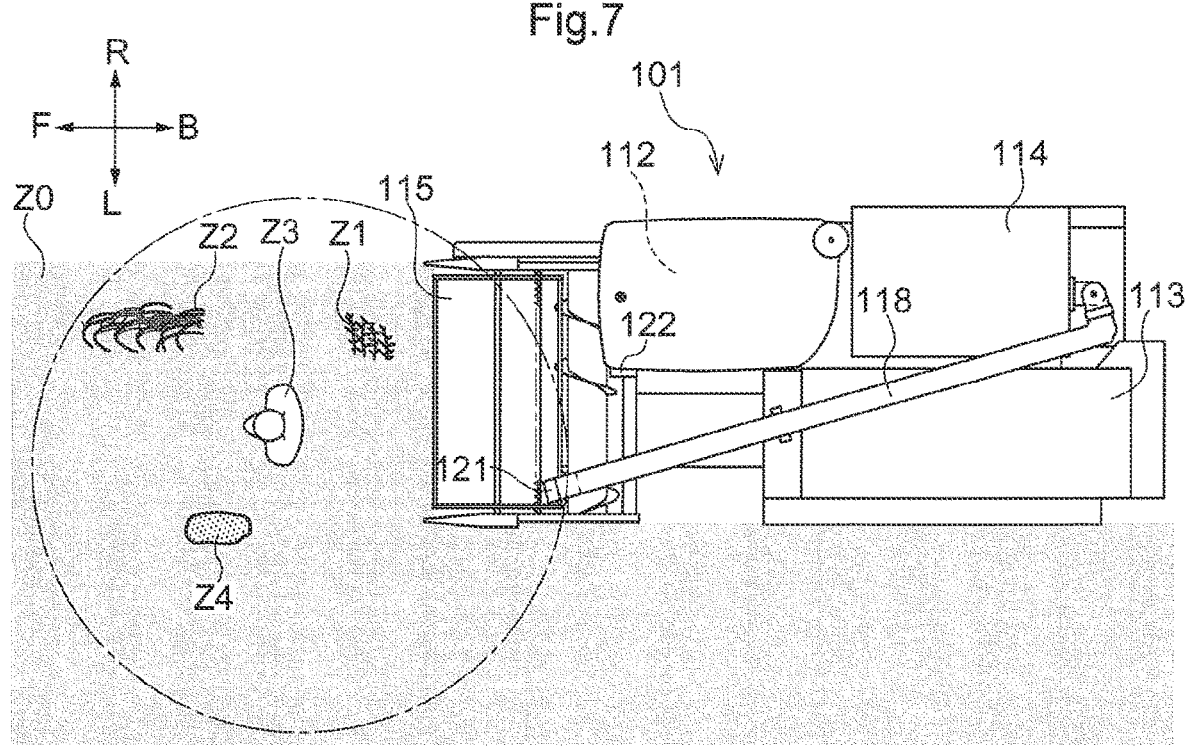
FIG. 7 is an overall plan view of the combine.

In a second embodiment, there will be disclosed a combine as one example of an agricultural work machine of the present invention. In the following, when the front-rear direction of a machine body 101 is to be defined, this definition will be made along the machine body advancing direction under a working state. The direction denoted with the sign (F) in FIG. 6 and FIG. 7 is the machine body front side, the direction denoted with the sign (B) in FIG. 6 and FIG. 7 is the machine body rear side. The direction denoted with the sign (U) in FIG. 6 is the machine body upper side and the direction denoted with the sign (D) in FIG. 6 is the machine body lower side. The direction denoted with the sign (L) in FIG. 6 is the machine body left side and the direction denoted with the sign (R) in FIG. 6 is the machine body right side, respectively. Further, when the left-right direction of the machine body 101 is to be defined, the left and the right will be defined as viewing from the machine body advancing direction.

[Basic Arrangement of Combine]

As shown in FIG. 6 and FIG. 7, a standard type combine as a mode of an agricultural work machine includes a machine body 101, a pair of left and right crawler type traveling devices 111, a riding section 112, a threshing device 113, a grain tank 114, a harvesting device 115, a conveying device 116 and a grain discharging device 118.

The traveling devices 111 are provided under the combine. The combine is capable of self-propelling by the traveling devices 111. Further, the riding section 112, the threshing device 113 and the grain tank 114 are provided on the upper side of the traveling devices 111 and these together constitute an upper section or structure of the machine body 101. A riding person of the combine or a monitoring person who monitors a work of the combine can ride the riding section 112. Normally, the riding person acts also as a monitoring person. Incidentally, in case the riding person and the monitoring person are different persons, the monitoring person may monitor the work of the combine from the outside of the machine body of the combine. Downwardly of the riding section 112, an engine (not shown) for driving is provided. The grain discharging device 118 is coupled to a rear lower portion of the grain tank 114.

The harvesting device 115 is supported to a front portion of the machine body 101. The conveying device 116 is provided adjacent the rear side of the harvesting device 115. The harvesting device 115 harvests agricultural products in a field. The products are e.g. planting culms of rice, etc., but may be soybeans, cone, etc. With this arrangement, the harvesting device 115 harvests the products in the field. And, this combine can effect work-performing traveling in which the combine travels by the traveling devices 111 while harvesting the products in the field by the harvesting device 115.

The products (e.g. reaped culms) harvested by the harvesting device 115 will be conveyed to the threshing device 113 by the conveying device 116. And, the harvested products are subjected to a threshing treatment by the threshing device 113. Grains as harvests obtained by the threshing treatment are stored in the grain tank 114. And, the grains stored in the grain tank 114 will be discharged, when needed, to the outside of the machine by the discharging device 118. The discharging device 118 is configured to be pivotable about a vertical axis of the machine body rear portion. Namely, the grain discharging device 118 is configured to be switchable between a discharging state in which the free end portion of the grain discharging device 118 protrudes to the machine body lateral outer side beyond the machine body 101 and can discharge the products and a storage state in which the free end portion of the grain discharging device 118 is located within the range of the machine body lateral width of the machine body 101. When the grain discharging device 118 is under the storage state, the free end portion of the grain discharging device 118 is positioned on the front side of the riding section 112 and upwardly of the harvesting device 115.

In the grain discharging device 118, at a side of a grain discharging outlet located at the free end portion, an imaging device 121 is provided. Further, though will be described later, at a front portion of the riding section 112, a distance sensor 122 is provided. And, this distance sensor 122 is configured to be capable of determining a distance between an obstacle present in the field forwardly of the machine body 101 and this machine body 101.

The imaging device 121 is a color camera capable of imaging visible light and can be e.g. a CCD camera or a CMOS camera. When the grain discharging device 118 is under the storage state, the imaging device 121 can image the forward side in the forward traveling direction of the combine with forwardly downward orientation from the position of the grain discharging outlet. In this, the imaging device 121 is located on the front side of the riding section 112 and is supported to the free end portion of the grain discharging device 118 with the imaging device 121 being inclined forwardly downwards in the front-rear direction. With this arrangement, in comparison with e.g. an arrangement in which the imaging device 121 is supported to a ceiling portion of the riding section 112, the imaging device 121 can image harvesting state of products at a close viewing point at the front end region of the harvesting device 115 with high quality. The imaging device 121 can capture an image of an obstacle object or the like present forwardly in a traveling direction as an image from a top-down viewpoint. For this reason, the imaging view in the front-rear direction of the imaging device 121 ranges from 15 meters to 25 meters for example. In this way, the imaging device 121 is provided at a position at the front portion of the machine body 101 and higher than the harvesting device 115 so as to command a top-down view on un-harvested products present forwardly of the harvesting device 115.

The captured image captured by the imaging device 121 are converted into image data and sent to the control system of the combine. The imaging device 121 images the field at the time of harvesting work. However, various kinds of objects can be present as imaging subjects in the field. The control system of the combine has a function of recognizing or discriminating a particular object as an obstacle object from the image data sent from the imaging device 121. As such obstacle subjects, in FIG. 6 and FIG. 7, there are schematically shown normal planting culm group denoted with a sign Z0 and weed group denoted with a sign Z1, collapsed culm group denoted with a sign Z2, a human denoted with a sign Z3, a stone denoted with a sign Z4.

In the ceiling portion of the riding section 112, there is provided a satellite positioning module 180. The satellite positioning module 180 receives signals (including GPS signals) of GNSS (Global Navigation Satellite System) from an artificial satellite GS and obtains a self-vehicle position. Incidentally, in order to supplement the satellite navigation by the satellite positioning module 180, an inertial navigation unit incorporating a gyro acceleration sensor or a magnetic azimuth sensor is incorporated in the satellite positioning module 180. Needless to say, the inertial navigation unit may be disposed at a site separate from the satellite positioning module 180 in the combine.

[Arrangement of Control Unit]

Figure 8:
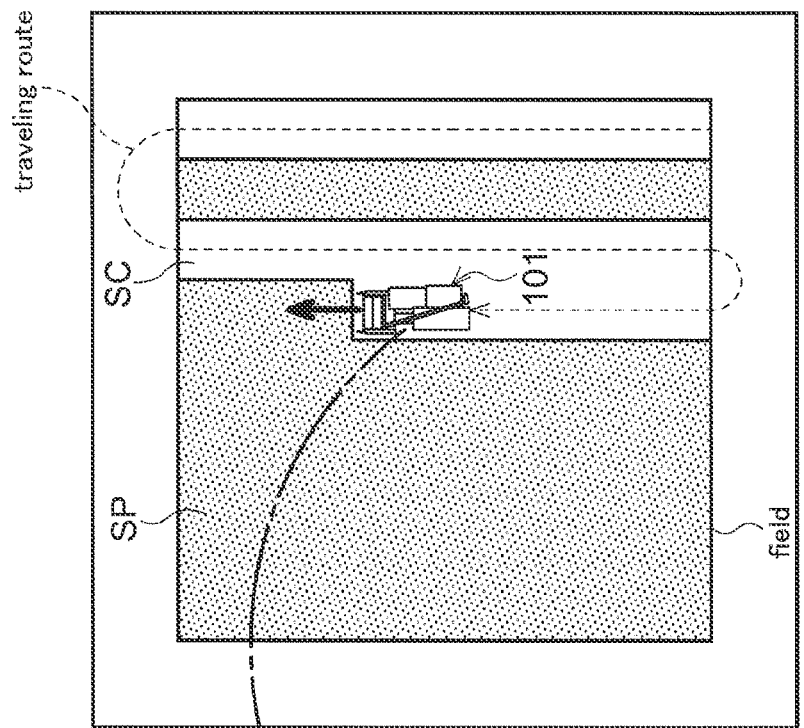
FIG. 8 is a view showing an outline of autonomous traveling of the combine.
Figure 8:
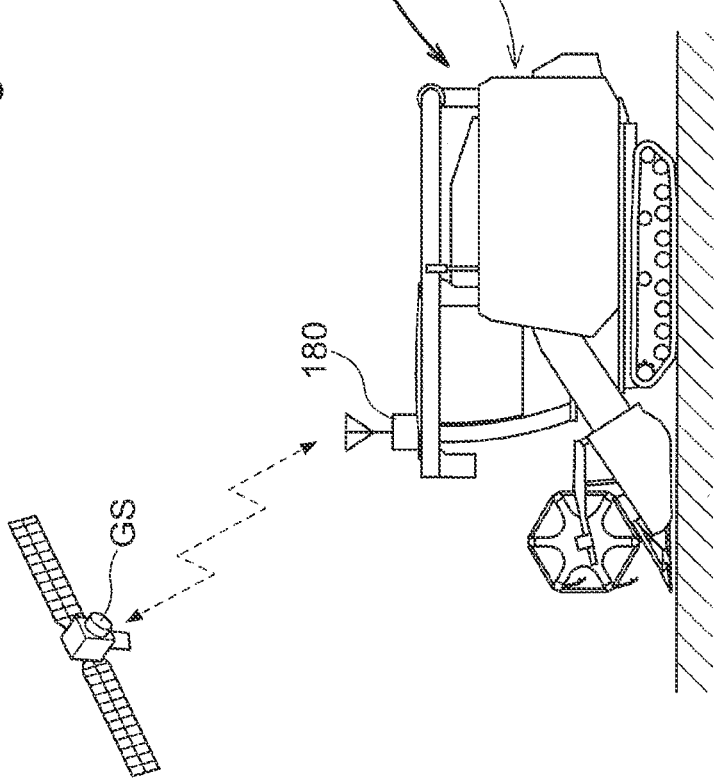

The combine of this embodiment can travel in both the autonomous traveling mode and the manual traveling mode. Here, the autonomous traveling refers to a work-performing traveling carried out autonomously or automatically along a preset traveling route in the field. FIG. 8 shows an un-worked area and a worked area in the field (to be referred to as a "un-harvested area SP" and a "harvested area SC", respectively). The un-harvested area SP and the harvested area SC are the inside areas of the field. The area outside the inside areas of the field is a near-ridge area of the field In FIG. 8, the combine travels straight in the inside areas of the field and makes a 180 degree turn in the near-ridge area of the field. In general, the traveling route is a route of alternate repetition of a straight traveling route in the inside area of the field and a turning traveling route in the near-ridge area of the field. A traveling mode switch (not shown) is provided for selecting between the autonomous traveling mode comprising traveling by autonomous steering and a manual traveling mode comprising traveling by manual steering. Shifting from the manual traveling to the autonomous traveling or shifting from the autonomous traveling to the manual traveling are possible by operations of the traveling mode switch. The traveling mode switch may be provided e.g. inside the riding section 112 or may be provided in a terminal CT to be described later, etc.

Incidentally, in the autonomous traveling, an imaging of the machine body front side by the imaging device 121 and an image recognition processing by the recognizing section 131 based on the image captured by the imaging device 121 are effected. To this end, in the autonomous traveling, the grain discharging device 118 needs to be set under the storage state. Namely, the autonomous traveling is effected in case the grain discharging device 118 is under the storage state. If the grain discharging device 118 is not under the storage state in the course of the autonomous traveling, a warning will be issued via a warning controlling section 136 or the reporting controlling section 137 to be described later for instance.

Figure 9:
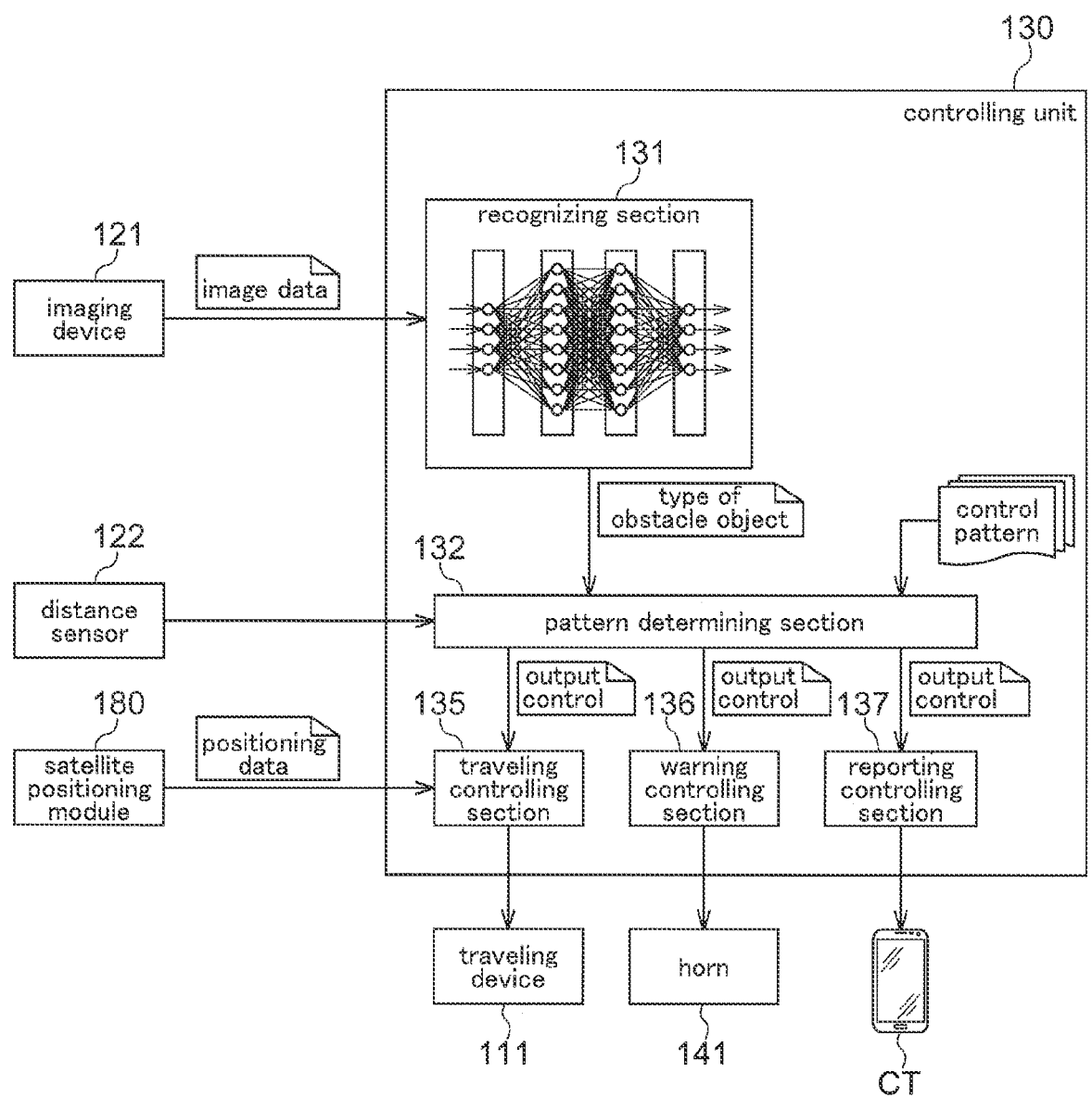
FIG. 9 is a functional block diagram showing a control system of the combine.

The controlling unit 130 shown in FIG. 9 is the core component of the control system of the combine and is shown as a group of a plurality of ECU's. The controlling unit 130 includes a recognizing section 131, a pattern determining section 132, a traveling controlling section 135, the warning controlling section 136, and the reporting controlling section 137. Further, the positioning data from the satellite positioning module 180 and the image data from the imaging device 121 are inputted via e.g. a wiring network to the controlling unit 130.

In the recognizing section 131, there is formed the neural network capable of learning by the deep learning technique. To the recognizing section 131, the image data of the captured images sequentially acquired by the imaging device 121 are inputted. As is known, the neural network can recognize an input-output relation having a non-linear characteristics through the deep learning technique. The recognizing section 131 estimates an area in the image where an obstacle object is present and outputs recognition output data based on the presence area as its recognition output.

Figure 10:
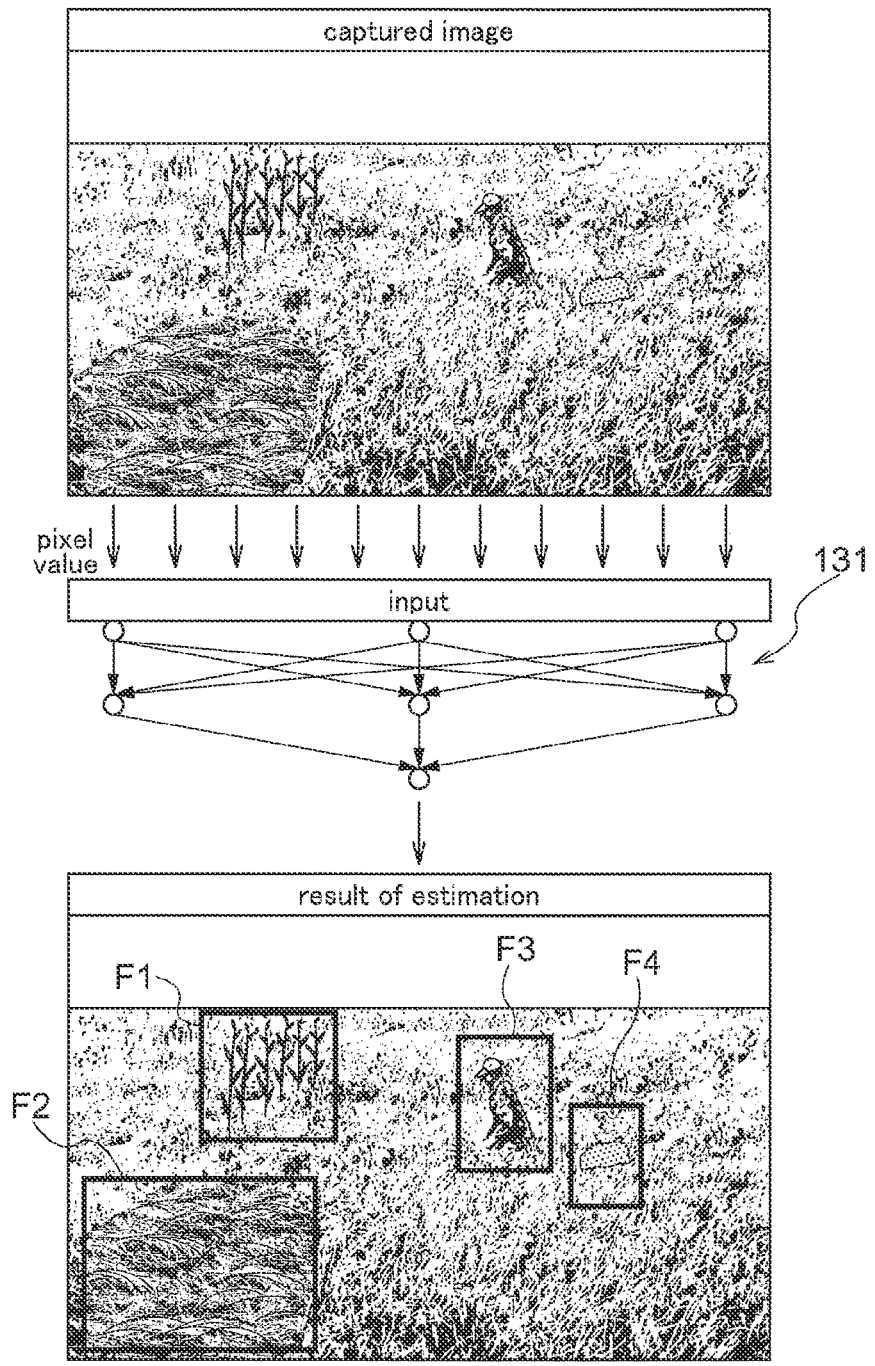
FIG. 10 is an explanatory view schematically showing flow of generation of recognition output data by a recognizing section.

The flow of generation of the recognition output data by the recognizing section 131 is shown in FIG. 10. To the recognizing section 131, pixel values of RGB image data from the imaging device 121 are inputted as input values. In the example shown in FIG. 10, the obstacle objects are collapsed culms, weeds, a human and a stone. Therefore, in the recognition output data as the recognition result, a collapsed culm area where the collapsed culms are present, a weed area where the weeds are present, a human area where the human is present and a stone area where the stone is preset are included. Incidentally, the stone may be hidden between or among the planting products, but the imaging device 121 can capture an image of such stone by the top-down viewpoint.

In FIG. 10, the weed area is represented by a rectangular frame denoted with a sign F1, the collapsed culm area is represented by a rectangular area denoted with a sign F2, the human area is represented by a rectangular area denoted with a sign F3, and the stone area is represented by a rectangular frame denoted with a sign F4, respectively. Namely, the recognizing section 131 is configured to be capable of recognizing the type of the obstacle object as presence of a foreign object such as a stone, presence of a human, presence of weed or collapsing of the product. In this way, the recognizing section 131 is configured to be capable of detecting presence of an obstacle object present on the advancing direction front side, based on the captured image captured by the imaging device 121. In addition, the recognizing section 131 is configured to be capable of recognizing the type of the obstacle object, through utilization of the neural network which has learned with use of the deep learning technique. The imaging device 121 obtains captured images by a predetermined time interval, e.g. 0.1 second interval, 0.5 second interval, etc. and inputs its image data to the recognizing section 131, so the recognizing section 131 too outputs the recognition output data by the same time interval.

The pattern determining section 132 shown in FIG. 9 determines a control pattern of the autonomous traveling control, based on the type of the obstacle object recognized by the recognizing section 131. Such control patterns are stored in a ROM, etc. in the form of a lookup table corresponding to the types of the obstacle objects and a control pattern will be selected by the pattern determining section 132.

The traveling controlling section 135 shown in FIG. 9 has an engine controlling function, a steering controlling function, a vehicle speed controlling function, etc. and provides traveling control signals to the traveling devices 11. In case the manual steering mode is selected, based on an operation by the riding person, the traveling controlling section 135 generates control signals and controls the traveling devices 111 thereby. In case the autonomous steering mode is selected, the traveling controlling section 135 effects controls relating to the steering and the vehicle speed for the traveling devices 111, based on an autonomous traveling command provided by the autonomous traveling controlling module of the controlling unit 130 and the positioning data from the satellite positioning module 180.

The warning controlling section 136 shown in FIG. 9 is a module for reporting a condition of the work-performing traveling of the machine body 101 and various kinds of warning to an animal or a human present e.g. in the route forwardly of the machine body 101 shown in FIG. 6 and FIG. 7 and is configured to be capable of effecting an output control on a horn 141. The horn 141 is provided at an appropriate position of the machine body 101. The reporting controlling section 137 is configured to be capable of outputting the control pattern determined by the pattern determining section 132 to a terminal CT such as a smartphone, a tablet computer, etc. and such control pattern will be displayed on the terminal CT. The terminal CT is carried by the riding person of the combine or a monitoring person or a managing person of the field and the reporting controlling section 137 is configured to be capable of allowing the person carrying the terminal CT to confirm the state of the control pattern or the history.

The combine of this embodiment includes the distance sensor 122 and is configured such that the distance between the machine body 101 and the obstacle object present in the route forwardly of the machine body 101 can be determined by the distance sensor 122. As shown in FIG. 7, in this embodiment, the distance sensor 122 is provided at front portion of the riding section 112, but the distance sensor 122 is provided at such a height at which determination of the forward side will not be interfered by the harvesting device 115. Further, the distance sensor 122 may be included in the harvesting device 115, or the distance sensor 122 may be a sonar or a radar (millimeter wave) or distance determining device (e.g. a laser scanner or a laser radar, to be referred to in short as "LIDAR" hereinafter) utilizing the LIDAR, namely, LIDAR (Light Detection and Ranging) technique. If the distance sensor 122 is a sonar, this is cost advantageous. If the distance sensor 122 is a millimeter-wave radar, determination hardly influenced by the weather is made possible and this is cost advantageous also. If the millimeter-wave radar is configured to be capable of three-dimensional scanning of the vertical direction, in addition to the forward direction and the left-right direction, it becomes possible to obtain a determining range wider than by a millimeter-wave radar of the two-dimension scanning type. If the distance sensor 122 is an LIDAR, accurate determination of the distance will be made possible. In addition, if the LIDAR is configured to be capable of three-dimensional scanning in the vertical direction in addition to the forward direction and the left-right direction, a wider determining range than LIDAR of a two-dimensional scanning type will be made possible.

[Types of Obstacle Objects and Control Patterns]

Next, an explanation relating to the types of the obstacle object and control patterns will be made based on FIGS. 9 through 12. As shown in FIG. 11, in this embodiment, as the control patterns, a plurality of control patterns are disclosed. And, the plurality of control patterns include deceleration of the machine body 101 (see FIGS. 6 and 7, same is true also in the following explanation), stop of the machine body 101 and warning for the obstacle object. Specifically, as control patterns, "stop", "deceleration, warning→stop", "deceleration, warning" and "deceleration" are illustrated. Incidentally, the types of the obstacle object shown in FIG. 11 are only exemplary, and ones other than those shown in FIG. 11 are not excluded.

FIG. 11 shows the types of the obstacle objects and the control patterns corresponding to the types of the obstacle object are also shown. When the type of the obstacle object is recognized by the recognizing section 131, the pattern determining section 132 selects a control pattern corresponding to the type of the obstacle object. In case the type of the obstacle object is a stone, a pole, a collapsed tree, etc., the pattern determining section 132 selects the control pattern of "stop". These objects, i.e. a stone, a pole, a collapsed tree, etc. do not move spontaneously unlike an animal. And, if the recognizing section 131 recognizes the type of the obstacle object as such non-spontaneously movable object, the pattern determining section 132 will determine, based on the table shown in FIG. 11, a control pattern relating to stop of the machine body 101. And, based on the control pattern relating to stop of the machine body 101, the pattern determining section 132 effects an output control of stop to the traveling controlling section 135. With this, the traveling devices 111 are stopped. Incidentally, the above-described obstacle object for which the output control of stop is selected is only exemplary. In addition to this, it may also be an erect tree, an electric pole, a field ridge, a straw roll, etc. Incidentally, in case the type of the obstacle object is a field ridge, it may be arranged such that a ridge present more outside the field than the turning route shown in FIG. 8 may be excluded from the obstacle objects.

In case the type of the obstacle object is an animal (e.g. a dog, a monkey, a pig, a cow, a craw, etc. namely, a cattle or an bird or animal), in order to chase away such animal present on the front side in the advancing direction, based on the table shown in FIG. 11, the pattern determining section 132 selects the control pattern of "deceleration, warning". An animal is spontaneously movable. Therefore, as a sound is issued from the horn 141 while the machine body 101 is decelerating, such animal will often move away from the route forwardly of the machine body 101. In this way, in case the recognizing section 131 recognizes the type of the obstacle object as a spontaneously movable type, the pattern determining section 132 will determine the control pattern relating to deceleration of the machine body 101 and the warning for the obstacle object. And, based on this control pattern relating to deceleration of the machine body 101 and the warning for the obstacle object, the pattern determining section 132 effects output controls respectively to the traveling controlling section 135 and the warning controlling section 136. With this, the speed of the traveling devices 111 is reduced and a sound is generated from the horn 141. Incidentally, the above-described obstacle object for which the control pattern of "deceleration, warning" is selected is only exemplary, it may be other than the above.

In case the recognizing section 131 recognizes the type of the obstacle object as being a human in the field, based on the table shown in FIG. 11, the pattern determining section 132 selects the control pattern of "deceleration, warning→stop". A threshold value for the distance between the machine body 101 and a human in the field will be set in advance. The pattern "deceleration, warning→stop" is a control pattern in which the control pattern of "deceleration, warning" and the control pattern of "stop" are switched over by the pattern determining section 132 based on the preset threshold value for the distance. While the distance between the machine body 101 and the human in the field is equal to or greater than the threshold value (or greater than the threshold value), the pattern determining section 132 effects an output control based on the control pattern of "deceleration, warning". And, if the distance between the machine body 101 and the human in the field is equal to or less than this threshold value (or less than the threshold value), the pattern determining section 132 effects an output control based on the control pattern of "stop". Incidentally, such threshold value for the distance between the machine body 101 and a human in the field can be e.g. 5 meters, 10 meters, etc.

Sometimes, other agricultural machines (e.g. a combine, a tractor, a management machine, an agricultural unmanned aircraft, etc.) or a vehicle (e.g. a truck) may travel within a field, but such machines may often be stopped in the field also. Thus, a situation that such machine or vehicle will not move spontaneously even if the machine body 101 approaches is highly conceivable. For this reason, in this embodiment, if the type of the obstacle object is other agricultural machine or a vehicle, in order to avoid contact between the machine body 101 and such agricultural machine or vehicle, the pattern determining section 132 selects the control pattern of "deceleration, warning→stop". Incidentally, the above-described obstacle object for which the control pattern of "deceleration, warning→stop" is selected is only exemplary, it may be other than the above.

If the type of the obstacle object is collapsed culm, weed, etc., based on the table shown in FIG. 11, the pattern determining section 132 selects the control pattern of "deceleration". Namely, such collapsed culm or weed may often present no significant problem in the autonomous traveling even if it is reaped directly by the harvesting device 115. However, in case the collapsed culm is reaped by the harvesting device 115, a situation requiring reduction of the speed of the work-performing traveling in order to reduce yield loss by raising the collapsed culm sufficiently is also conceivable. For this reason, if the recognizing section 131 recognizes that the type of the obstacle object will not present any significant problem in the autonomous traveling, the pattern determining section 132 selects a control pattern of decelerating the traveling devices 111 while allowing continuation of the autonomous traveling. Incidentally, the above-described obstacle object for which the control pattern of "deceleration" is selected is only exemplary, it may be any other than the above.

As described above, the pattern determining section 132 is configured to be capable of determining a control pattern in accordance with the type of the obstacle object, but also capable of controlling the output control based on the control pattern. In other words, the pattern determining section 132 is configured to allow output control in accordance with an abnormality in a field detected by the recognizing section 131.

FIG. 12 shows a flowchart relating to the determination of the control patterns. This flowchart is an overview of contents processing in the pattern determining section 132 in case the presence of an obstacle object is recognized by the recognizing section 131. In other words, the pattern determining section 132 executes an abnormality situation control based on this flowchart, in accordance with the field abnormality detected by the recognizing section 131. Therefore, the contents processing in the pattern determining section 132 is not limited to this flowchart, but may be modified within a range not impairing identity of the detection result. Firstly, based on the recognition output data outputted by the recognizing section 131, at least one control pattern is selected from among the plurality of control patterns (step "01"). In case the control pattern of "stop" is selected by the pattern determining section 132 (step #01: stop), the output control of stop for the traveling controlling section 135 is executed at step #06, and the traveling devices 111 are stopped by the traveling controlling section 135.

If the control pattern of "deceleration, warning→stop" or "deceleration, warning" is selected by the pattern determining section 132 at step #01, at step #02, it is determined whether this pattern is the pattern in which "deceleration, warning" is followed by "stop", namely, the pattern of "deceleration, warning→stop" or not. If it is determined at step #02 that the pattern is the pattern of "deceleration, warning→stop", the process proceeds to step #03. If the control pattern of "deceleration, warning" is selected by the pattern determining section 132, the process proceeds from step #02 to step #04.

If a human area is included in the recognition output data outputted by the recognizing section 131, the pattern determining section 132 selects the control pattern of "deceleration, warning→stop". Therefore, at step #03, the process determines whether the distance between the machine body 101 and the human is equal to or greater than the preset distance (or greater than the distance) or not. The distance between the machine body 101 and the human is determined by the distance sensor 122. If the distance between the machine body 101 and the human is equal to or greater than the preset distance (or greater than the preset distance) (step #03: Yes), then, the process goes to step #04 and processing based on the control pattern of "deceleration, warning" is effected at step #04 and step #05.

At step #04, the pattern determining section 132 effects an output control for the traveling controlling section 135, based on the control pattern of "deceleration, warning". And, the traveling controlling section 135 effects the control for reducing the vehicle speed for the traveling devices 111. At step #05, the pattern determining section 132 effects an output control based on the control pattern of "deceleration, warning" for the warning controlling section 136. And, the warning controlling section 136 effects control for the horn 141 for this horn 141 to generate a sound.

If the distance between the machine body 101 and the human is equal or less than the preset distance (or below the preset distance) (step #03: No), the process goes to step #06 and a processing based on the control pattern of "stop" is effected at step #06. At step #06, the pattern determining section 132 effects an output control based on the control pattern of "stop" to the traveling controlling section 135. And, the traveling controlling section 135 effects a stopping control for the traveling devices 111. In this way, the pattern determining section 132 determines control patterns relating to stop of the machine body 101 in case the distance between the machine body 101 and the human becomes equal to or less than the preset distance (or less than the preset distance).

In case the controlling pattern of "deceleration" is selected by the pattern determining section 132 (step #01: deceleration), the processing of step #07 is effected. At this step #07, the pattern determining section 132 effects an output control based on the control pattern of "deceleration" for the traveling controlling section 135. And, the traveling controlling section 135 effects control of reducing the vehicle speed for the traveling devices 111.

Upon completion of the process at step #05 or step "06 or step #07, the pattern determining section 132 outputs to the reporting controlling section 137 and the condition of the control pattern is transmitted via the reporting controlling section 137 to the terminal CT (step #08). With this, on the terminal CT, the current condition of the control pattern or the history of the control pattern is displayed, so that the monitoring person or the managing person of the field carrying the terminal CT can grasp a change in the condition of the machine body 101 based on the change of the control pattern.

Further Embodiments of Second Embodiment

The present invention is not limited to the arrangements illustrated in the foregoing embodiment. In the following, representative further embodiments of the present invention will be cited.

(1) In the foregoing embodiment, the imaging device 121 is provided on the front side of the riding section 112 in order to capture an image of the front side in the advancing direction of the machine body 101. However, the invention is not limited thereto. For instance, the imaging device 121 may be provided at the rear end portion of the machine body 101 so as to be able to capture an image of the reverse traveling direction of the machine body 101. Further alternatively, the imaging device 121 may be provided both on the front side of the riding section 112 and at the rear end portion of the machine body 101. Namely, the imaging device 121 is configured to be capable of imaging one or both of the front side of the forward traveling of the machine body 101 and the rear side of the reverse traveling of the machine body 101.

(2) In the foregoing embodiment, in the recognizing section 131, the neural network capable of learning by the deep learning technique is formed. However, such neural network may not be formed in the recognizing section 131. In this case, a neural network will be formed in a further computer or a further terminal CT and it may be arranged such that inputs and outputs in the neural network are effected via communication made between the recognizing section 131 and the other computer or terminal CT. Namely, the recognizing section 131 may be configured advantageously to be capable of recognizing the type of the obstacle object through utilization of a neural network which has learned with use of the deep learning technique.

(3) In the foregoing embodiment, in case the type of the obstacle object is some other (i.e. non-self) agricultural machine or a vehicle, the control pattern of "deceleration, warning→stop" is selected by the pattern determining section 132. However, the invention is not limited thereto. The other agricultural machine or vehicle recognized by the recognizing section 131 may be recognized as an obstacle object which is not spontaneously movable and the control pattern of "stop" may be selected by the pattern determining section 132.

(4) In the foregoing embodiment, in case the type of the obstacle object is an animal, the control pattern of "deceleration, warning" is selected by the pattern determining section 132. However, the control pattern of "deceleration, warning" may consist of "warning" alone. Namely, if the control pattern of "warning" is selected by the pattern determining section 132, the pattern determining section 132 does not effect an output control to the traveling controlling section 135, but may effect an output control for the warning controlling section 136 based on the control pattern relating to warning for the obstacle object. With this, the speed of the traveling devices 111 is not reduced and a sound is generated from the horn 141.

(5) In the foregoing embodiment, the warning controlling section 136 is configured to be capable of output control for the horn 141. However, the invention is not limited thereto. For instance, the output control of the warning controlling section 136 may be provided for e.g. a buzzer, a lamp, a search light, a speaker, a display, etc. Further, the warning controlling section 136 may be configured to chase away bird or animal or the like with use of ultrasonic wave. In this case, the warning controlling section 136 may be configured to effect an output control such that the closer the machine body 101 moves to the bird or animal, the stronger ultrasonic wave is outputted.

(6) In the foregoing embodiment, in case the type of the obstacle object is an animal, the control pattern of "deceleration, warning" is selected by the pattern determining section 132. Alternatively, the control pattern of "deceleration, warning→stop" may be selected by the pattern determining section 132. And, in the case of the control pattern of "deceleration, warning→stop", the pattern determining section 132 effects switchover between the control pattern of "deceleration, warning" and the control pattern of "stop" based on the threshold value for the distance between the machine body 101 and the obstacle object. In this, the threshold value may be different for the case of an animal and the case of a human. For instance, in the case of a human being the obstacle object, the threshold value may be set to 5 meters or 10 meters, and in the case of an animal being the obstacle object, the threshold value may be set to 2-3 meters, for instance.

(7) The warning controlling section 136 and the reporting controlling section 137 may be formed as one unit. Further, the pattern determining section 132, the traveling controlling section 135, the warning controlling section 136 and the reporting controlling section 137 may be formed as one unit.

(8) In the foregoing embodiment, in case the type of the obstacle object is a stone, a pole, a collapsed tree or a straw roll, the control pattern of "stop" is selected by the pattern determining section 132. However, the invention is not limited thereto. For instance, the pattern determining section 132 may select a control pattern for causing the machine body 101 to circumvent a stone, a pole, a collapsed tree, a straw roll, etc. in order to avoid contact therewith instead of the control pattern of "stop". Namely, in case the recognizing section 131 recognizes the type of the obstacle object as being a non-spontaneously movable one, the pattern determining section 132 may determine the control pattern relating to the circumventing of the machine body 101.

(9) In the foregoing embodiment, as shown in FIG. 12, in case the control pattern of "deceleration" is selected by the pattern determining section 132, the speed reducing processing based on the processing at step #07 is effected. However, the invention is not limited thereto. For instance, in case the obstacle object is a collapsed culm or weed, this may be recognized as a non-object other than an obstacle object. In this case, the processing of the flowchart shown in FIG. 12 may not be effected, and the autonomous traveling may be continued as it is.

Further, in case the agricultural machine is a culm head charging type combine, if the type of the obstacle object is recognized as a weed by the recognizing section 131, then, the threshing depth in the threshing device 113 may be adjusted. Namely, if the weed is erroneously recognized as a spearhead as the weed is located at a higher position than the spearhead, there is the risk of the threshing depth in the threshing device 113 being too short. In order to avoid such inconvenience, advantageously, the recognizing section 131 may be configured to discriminate between a weed and a spearhead and the threshing depth in the threshing device 113 may be adjusted based thereon.

(10) In the foregoing embodiment, there is provided the distance sensor 122 capable of determining the distance between the machine body 101 and the obstacle object. However, the distance sensor 122 may be omitted. In this case, if the recognizing section 131 recognizes the type of the obstacle object being an animal or a human, based on the position of such animal or human in the captured image captured by the imaging device 121, the pattern determining section 132 may determine the control pattern relating to stop of the machine body 101.

(11) The agricultural machine relating to the present invention is not limited to the standard type combine, but may be a culm head charging type combine. Further, the agricultural machine relating to the present invention is not limited to combines, but may be other harvesters. Further, the agricultural machine relating to the present invention is not limited to harvesters, but may be any other agricultural machine such as a rice planter, a seeding machine, a field maintenance machine, a tractor, etc.

(12) Further, a system, a program, a recording medium and a method relating to the above-described agricultural machine are also encompassed within the scope of the present invention. For instance, a controlling system, a controlling method and a controlling program and a compute-readable recording medium recording therein the controlling program for an agricultural machine configured to effect an output control relating to an obstacle object in a field based on a captured image captured by an imaging device capable of imaging the front side of the forward traveling direction and/or the reverse traveling direction at the time of traveling of the agricultural machine in the field are also encompassed within the scope of the present invention.

(13) Incidentally, the arrangements disclosed in the foregoing embodiments (including the further embodiments) may be used in any combination with the arrangements disclosed in the other embodiment(s), unless no contradiction results from such combining. Further, it is understood that the embodiments disclosed in this detailed description are only illustrative and embodiments of the present invention are not limited thereto, but various modifications can be made appropriately thereto within a range not departing from the essence of the present invention.

DESCRIPTION OF SIGNS

First Embodiment

3: planting culm (farm product)
6: abnormality

7: foreign object
8: weed
9: collapsing
10: machine body
11: traveling device
12: driving section
13: threshing device
14: grain tank
16: conveying device
17: reel
18: discharging device
19: discharging section
21: camera (imaging device)
25: controlling device
26: detecting section
27: determining section
29: controlling section
30: neural network
36: adjusting section
37: reporting section
H: harvesting section
SP: un-worked area Second Embodiment 101: machine body
121: imaging device
122: distance sensor
131: recognizing section
132: pattern determining section

The invention claimed is:

1. A harvester configured to effect a work-performing traveling for harvesting agricultural products in a field while traveling in the field autonomously, the harvester comprising:
a traveling device effecting the work-performing traveling;
a machine body supported to the traveling device;
a harvesting section supported to a front portion of the machine body and for harvesting the products in the field;
a threshing device for threshing the harvested product;
a conveying device for conveying the harvested product from the harvesting section to the threshing device;
a grain tank for storing a threshed product;
a vertical conveying section coupled to a lower portion of the grain tank;
a horizontal conveying section coupled to an upper end portion of the vertical conveying section;
a discharging device for discharging the product stored in the grain tank from a discharging section provided at a leading end portion of the horizontal conveying section;
an imaging device provided at a front portion of the machine body and at a position higher than the harvesting section so as to view down a product present in an un-worked area located forwardly of the harvesting section;
a detecting section for detecting abnormality in the field from an image imaged by the imaging device; and
a controlling section for executing an abnormality situation control as a control in accordance with the abnormality detected in the field,
wherein the imaging device is provided in the horizontal conveying section,
wherein the discharging device is configured for selectively assuming a mode in which the discharging device is stored at a storage position and a mode which is assumed when the stored product is to be discharged and the discharging section protrudes from the machine body, and
wherein the autonomous traveling is effected only when the discharging device is stored at the storage position.

2. The harvester of claim 1, wherein by inputting the image to a neural network machine-learned with using a deep learning technique, the controlling section determines whether the abnormality in the field is a presence of a foreign object or a presence of a weed or a collapsing of the agricultural product.

3. The harvester of claim 2, wherein in case the abnormality in the field is determined to be the presence of a foreign object, the controlling section decelerates or stops the machine body as the abnormality situation control.

4. The harvester of claim 3, wherein the foreign object is an obstacle hidden among or between planting products.

5. The harvester of claim 2, wherein if the abnormality in the field is determined to be the collapsing of the agricultural product, the controlling section decelerates the machine body as the abnormality situation control.

6. The harvester of claim 1, wherein:
the machine body comprises a driving section disposed at a front portion of the machine body; and
the imaging device is provided forwardly of the driving section.

7. The harvester of claim 1, further comprising a reporting section that issues a warning if the discharging device is away from the storage position at the time of autonomous traveling.

8. A harvester configured to effect a work-performing traveling for harvesting agricultural products in a field while traveling in the field autonomously, the harvester comprising:
a traveling device effecting the work-performing traveling;
a machine body supported to the traveling device;
a harvesting section supported to a front portion of the machine body and for harvesting the products in the field;
an imaging device provided at a front portion of the machine body and at a position higher than the harvesting section so as to view down a product present in an un-worked area located forwardly of the harvesting section;
a detecting section for detecting abnormality in the field from an image imaged by the imaging device; and
a controlling section for executing an abnormality situation control as a control in accordance with the abnormality detected in the field,
the machine body comprising:
a threshing device for threshing the harvested product;
a conveying device for conveying the harvested product from the harvesting section to the threshing device; and
an adjusting section provided in the conveying device and configured to adjust a threshing depth of the product to be conveyed to the threshing device; and
wherein if the abnormality in the field is determined to be the presence of weed, the controlling section causes the adjusting section to suspend the threshing depth adjustment as the abnormality situation control.

9. An abnormality control system for a harvester configured to control abnormality detected in a field when a harvester having a harvesting section supported to a front portion of a machine body carries out a work-performing traveling for harvesting farm products in the field while the harvester is effecting an autonomous traveling, the harvester having a threshing device for threshing the harvested product, a conveying device for conveying the harvested product from the harvesting section to the threshing device, a grain tank for storing threshed product, a vertical conveying section coupled to a lower portion of the grain tank, a horizontal conveying section coupled to an upper end portion of the vertical conveying section, and a discharging device for discharging the product stored in the grain tank from a discharging section provided at a leading end portion of the horizontal conveying section, the horizontal conveying section and the discharging device being configured for selectively assuming a mode in which the discharging device is stored at a storage position and a mode which is assumed when the stored product is to be discharged and the discharging section protrudes from the machine body, the system comprising:

a detecting section provided in the horizontal conveying section for detecting the abnormality in the field from an image imaged by an imaging device configured to image from the above of the product present in an un-worked area forwardly of the harvesting section;

a determining section for determining the type of the abnormality; and a controlling section for executing abnormality situation control in accordance with the determined type of the abnormality, wherein the autonomous traveling is effected only when the discharging device is stored at the storage position.

10. A computer program product comprising at least one non-transitory computer-readable storage medium including an abnormality control program for a harvester configured to control abnormality detection in a field when a harvester having a harvesting section supported to a front portion of a machine body carries out a work-performing traveling for harvesting farm products in the field while the harvester is effecting an autonomous traveling, the harvester having a threshing device for threshing the harvested product, a conveying device for conveying the harvested product from the harvesting section to the threshing device, a grain tank for storing threshed product, a vertical conveying section coupled to a lower portion of the grain tank, a horizontal conveying section coupled to an upper end portion of the vertical conveying section, and a discharging device for discharging the product stored in the grain tank from a discharging section provided at a leading end portion of the horizontal conveying section, the horizontal conveying section and the discharging device being configured for selectively assuming a mode in which the discharging device is stored at a storage position and a mode which is assumed when the stored product is to be discharged and the discharging section protrudes from the machine body, the program, when executed by a computer comprising at least one processor, causes the computer to perform:

a detecting function detecting the abnormality in the field from an image imaged by an imaging device configured to image from the above of the farm product present in an un-worked area forwardly of the harvesting section, the imaging device being provided in the horizontal conveying section;

a determining function determining the type of the abnormality;

a controlling function executing abnormality situation control in accordance with the determined type of the abnormality, and a function executing the autonomous traveling of the harvester only when the discharging device is stored at the storage position.

11. A non-transitory computer-readable recording medium comprising an abnormality control program for a harvester configured to control abnormality detection in a field when a harvester having a harvesting section supported to a front portion of a machine body carries out a work-performing traveling for harvesting farm products in the field while the harvester is effecting an autonomous traveling, the harvester having a threshing device for threshing the harvested product, a conveying device for conveying the harvested product from the harvesting section to the threshing device, a grain tank for storing the threshed product, a vertical conveying section coupled to a lower portion of the grain tank, a horizontal conveying section coupled to an upper end portion of the vertical conveying section, and a discharging device for discharging the product stored in the grain tank from a discharging section provided at a leading end portion of the horizontal conveying section, the horizontal conveying section and the discharging device being configured for selectively assuming a mode in which the discharging device is stored at a storage position and a mode which is assumed when the stored product is to be discharged and the discharging section protrudes from the machine body, the program, when executed by a computer comprising at least one processor, causes the computer to perform:

a detecting function detecting the abnormality in the field from an image imaged by an imaging device configured to image from the above the product present in an un-worked area forwardly of the harvesting section, the imaging device being provided in the horizontal conveying section;

a determining function determining the type of the abnormality;

a controlling function executing abnormality situation control in accordance with the determined type of the abnormality; and a function executing the autonomous traveling of the harvester only when the discharging device is stored at the storage position.

12. An abnormality controlling method for a harvester configured to control abnormality detection in a field when a harvester having a harvesting section supported to a front portion of a machine body carries out a work-performing traveling for harvesting farm products in the field while the harvester is effecting an autonomous traveling only when a discharging device is stored at a storage position, the harvester having a threshing device for threshing the harvested product, a conveying device for conveying the harvested product from the harvesting section to the threshing device, a grain tank for storing the threshed product, a vertical conveying section coupled to a lower portion of the grain tank, a horizontal conveying section coupled to an upper end portion of the vertical conveying section, and the discharging device for discharging the product stored in the grain tank from a discharging section provided at a leading end portion of the horizontal conveying section, the horizontal conveying section and the discharging device being configured for selectively assuming a mode in which this discharging device is stored at a storage position and a mode which is assumed when stored product is to be discharged and the discharging section protrudes from the machine body, the method comprising:

a step of detecting an abnormality in the field from an image imaged by an imaging device configured to image from the above the product present in an unworked area forwardly of the harvesting section, the imaging device being provided in the horizontal conveying section;
a step of determining the type of the abnormality;
a step of executing abnormality situation control in accordance with the determined type of the abnormality; and
a step of executing the autonomous traveling of the harvester only when the discharging device is stored at the storage position.

13. An agricultural work machine comprising:
a threshing device for threshing the harvested product;
a conveying device for conveying the harvested product from the harvesting section to the threshing device;
a grain tank for storing threshed product;
a discharging device swingable about a vertical axis which is located at a rear portion of a machine body, and switchable between a stored state in which a swinging end thereof is located within a lateral inner side of the machine body and a discharge state in which the swinging end is overhung to a lateral outer side of the machine body to discharge the product stored in the grain tank from the swinging end;
an imaging device for capturing an image of traveling direction front side of one or both of a forward traveling and a reverse traveling of the machine body in a field;
a recognizing section for detecting presence of an obstacle object in the field and for recognizing the type of the obstacle object, based on the captured image captured by the imaging device;
a pattern determining section for determining one control pattern from a plurality of control patterns in accordance with the type of the obstacle object and executing an output control based on the determined control pattern; and
a controlling unit for executing an autonomous traveling only in a case of the discharging device being in the stored state.

14. The agricultural work machine of claim 13, wherein the recognizing section is configured to be able to recognize the type of the obstacle object with utilization of a neural network learned with use of the deep learning technique.

15. The agricultural work machine of claim 13, wherein the plurality of control patterns includes deceleration of the machine body, stop of the machine body, and warning against the obstacle object.

16. The agricultural work machine of claim 15, wherein when the recognizing section recognizes that the obstacle object is of a non spontaneously moving type, the pattern determining section determines the control pattern relating to the stop of the machine body.

17. The agricultural work machine of claim 15, wherein when the recognizing section recognizes that the obstacle object is of a spontaneously moving type, the pattern determining section determines the control patterns relating to the deceleration of the machine body and the warning against the obstacle object.

18. The agricultural work machine of claim 17, wherein:
there is provided a distance sensor capable of determining a distance between the machine body and the obstacle object; and
the pattern determining section determines the control pattern relating to the stop of the machine body if the distance becomes equal to or less than a preset distance.

19. The agricultural work machine of claim 18, wherein the distance sensor comprises a sonar.

20. The agricultural work machine of claim 18, wherein the distance sensor comprises a LIDAR.

21. The agricultural work machine of claim 18, wherein the distance sensor comprises a laser scanner.

22. A control system for an agricultural work machine executing an output control for an obstacle object present in a field based on an image captured by an imaging device capable of capturing an image of traveling direction front side of one or both of a forward traveling and a reverse traveling of a machine body when the agricultural work machine travels in the field, the agricultural work machine having a threshing device for threshing harvested product, a conveying device for conveying the harvested product from a harvesting section to the threshing device, a grain tank for storing threshed product, and a discharging device swingable about a vertical axis which is located at a rear portion of the machine body, and switchable between a stored state in which a swinging end thereof is located within a lateral inner side of the machine body and a discharge state in which the swinging end is overhung to a lateral outer side of the machine body to discharge the product stored in the grain tank from the swinging end, the control system comprising:
a recognizing section for detecting a presence of the obstacle object in the field and recognizing the type of the obstacle object, based on the captured image captured by the imaging device;
a pattern determining section for determining one control pattern from a plurality of control patterns in accordance with the type of the obstacle object and executing an output control based on the determined control pattern; and
a controlling unit for executing an autonomous traveling only in a case of the discharging device being in the stored state.

23. A computer program product comprising at least one non-transitory computer-readable storage medium including a program executing an output control for an obstacle object in a field, based on an image captured by an imaging device capable of capturing an image of traveling direction front side of one or both of a forward traveling and a reverse traveling of a machine body when an agricultural work machine travels in the field, the agricultural work machine having a threshing device for threshing harvested product, a conveying device for conveying the harvested product from a harvesting section to the threshing device, a grain tank for storing threshed product, and a discharging device swingable about a vertical axis which is located at a rear portion of a machine body, and switchable between a stored state in which a swinging end thereof is located within a lateral inner side of the machine body and a discharge state in which the swinging end is overhung to a lateral outer side of the machine body to discharge the product stored in the grain tank from the swinging end, the program, when executed by a computer comprising at least one processor, causes the computer to perform:
a function of detecting a presence of the obstacle object in the field, based on the captured image;
a function of recognizing the type of the obstacle object, based on the captured image;
a function of selecting a control pattern from a plurality of control patterns, in accordance with the type of the obstacle object;
a function of executing the output control based on the control pattern; and
a function of executing an autonomous traveling of the agricultural work machine only in a case of the discharging device being in the stored state.

24. A non-transitory computer-readable recording medium comprising a program for executing an output control for an obstacle object in a field, based on an image captured by an imaging device capable of capturing an image of traveling direction front side of one or both of a forward traveling and a reverse traveling of a machine body when an agricultural work machine travels in the field, the agricultural work machine having a threshing device for threshing harvested product, a conveying device for conveying the harvested product from a harvesting section to the threshing device, a grain tank for storing threshed product, and a discharging device swingable about a vertical axis which is located at a rear portion of a machine body, and switchable between a stored state in which a swinging end thereof is located within a lateral inner side of the machine body and a discharge state in which the swinging end is overhung to a lateral outer side of the machine body to discharge the product stored in the grain tank from the swinging end, the program being configured to execute the autonomous traveling of the agricultural work machine only in a case of the discharging device being in the stored state, the program, when executed by a computer comprising at least one processor, causes the computer to perform:
- a function of detecting presence of the obstacle object in the field, based on the captured image;
- a function of recognizing the type of the obstacle object, based on the captured image;
- a function of selecting a control pattern from a plurality of control patterns, in accordance with the type of the obstacle object;
- a function of executing the output control based on the control pattern; and
- a function of executing an autonomous traveling of the agricultural work machine only in a case of the discharging device being in the stored state.

25. A control method for an agricultural work machine executing an output control for an obstacle object in a field, based on an image captured by an imaging device capable of capturing an image of traveling direction front side of one or both of a forward traveling and a reverse traveling of a machine body when the agricultural work machine travels in the field, the agricultural work machine having a threshing device for threshing harvested product, a conveying device for conveying the harvested product from a harvesting section to the threshing device, a grain tank for storing threshed product, and a discharging device swingable about a vertical axis which is located at a rear portion of the machine body, and switchable between a stored state in which a swinging end thereof is located within a lateral inner side of the machine body and a discharge state in which the swinging end is overhung to a lateral outer side of the machine body to discharge the product stored in the grain tank from the swinging end, a program being configured to execute autonomous traveling of the agricultural work machine only in a case of the discharging device being in the stored state, the method comprising:
- a step of detecting a presence of the obstacle object in the field, based on the captured image;
- a step of recognizing the type of the obstacle object, based on the captured image;
- a step of selecting a control pattern from a plurality of control patterns, in accordance with the type of the obstacle object;
- a step of executing the output control based on the control pattern; and
- a step of executing the autonomous traveling of the agricultural work machine only in a case of the discharging device being in the stored state.

\* \* \* \* \*